United States Patent [19]
Maki et al.

[11] Patent Number: 6,010,221
[45] Date of Patent: Jan. 4, 2000

[54] PROJECTION TYPE DISPLAY APPARATUS

[75] Inventors: Hiroshi Maki; Kiyoshi Numazaki; Masaaki Kusano; Tetsuo Hattori, all of Kanagawa; Atsushi Sekine, Saitama, all of Japan

[73] Assignee: Nikon Corporation, Tokyo, Japan

[21] Appl. No.: 09/080,932

[22] Filed: May 19, 1998

[30] Foreign Application Priority Data

| May 22, 1997 | [JP] | Japan | 9-132027 |
| Jul. 18, 1997 | [JP] | Japan | 9-209623 |

[51] Int. Cl.[7] ............................ G03B 21/14
[52] U.S. Cl. ............................ 353/33; 349/8
[58] Field of Search ............... 353/119, 31, 33, 353/34, 37, 81; 349/5, 8, 9

[56] References Cited

U.S. PATENT DOCUMENTS

| 5,028,121 | 7/1991 | Baur et al. | 353/31 |
| 5,357,289 | 10/1994 | Konno et al. | 353/33 |
| 5,605,390 | 2/1997 | Brice et al. | 353/34 |
| 5,653,520 | 8/1997 | Kato | 353/34 |
| 5,653,522 | 8/1997 | Loucks | 353/31 |
| 5,658,060 | 8/1997 | Dove | 353/33 |
| 5,786,934 | 7/1998 | Chiu et al. | 353/34 |
| 5,798,819 | 8/1998 | Hattori et al. | 353/33 |

*Primary Examiner*—William Dowling
*Attorney, Agent, or Firm*—Foley & Lardner

[57] ABSTRACT

An analyzing-synthesizing optical system has the structure in which for each of the three primary colors of R, G, and B, there are provided a light valve for modulating incident light and a polarization beam splitter for guiding specific polarized light to this light valve and extracting only modulated light coming from the light valve to output it, wherein these light valves and polarization beam splitters are fixed as integrated with a synthesizing optical system comprising a cross dichroic prism and wherein optical path lengths of optical paths of the respective colors are adjusted to be almost equal to each other. A projection image display apparatus comprises the analyzing-synthesizing optical unit.

12 Claims, 18 Drawing Sheets

PROJECTION TYPE DISPLAY APPARATUS

BACKGROUND OF THE INVENTION

1. Field of the Invention

The present invention relates to a projection type display apparatus using a plurality of light valves and, more particularly, to a constituent part mainly including a synthesizing optical system for synthesizing beams projected from respective light valves in the projection type display apparatus.

2. Related Background Art

Such projection type display apparatus as a color projector are used as large-screen image display apparatus and the projection type display apparatus of this type are classified under a method called a single plate method for directly magnifying and projecting a color image and a method called a three plate method for synthesizing images of the three primary colors R (red), G (green), B (blue) and projecting the synthesized image. The three plate method requires more complex apparatus structure than the single plate method, but is easier in color adjustment and more advantageous in color reproduction, resolution, and so on than the single plate type. The three plate method is thus popularly employed in imagery equipment or the like.

An example of such three plate method projection type display apparatus is shown in FIG. 18. White source light including the respective colors R, G, B, emitted from a light source not illustrated, is split into two directions of respective polarization components by polarization beam splitter 11'. Only R light in the component reflected by the polarization beam splitter 11' is transmitted by red transmitting dichroic filter 52 to enter light valve 12R for R signal. The R light is modulated to light having an image signal of R signal and this light travels again through the red transmitting dichroic filter 52 to enter the polarization beam splitter 11'. Only the signal component is extracted from the light in the polarization beam splitter 11' to be outputted. On the other hand, the G light component of the polarized light component transmitted by the polarization beam splitter 11' is reflected to branch off by green reflecting dichroic mirror 51 to enter light valve 12G for G signal. The G light is modulated to light having an image signal of G signal to be reflected. Then the light is again reflected by the green reflecting dichroic mirror 51 to enter the polarization beam splitter 11', in which only the signal component is extracted to be outputted. The B light component in the light transmitted by the green reflecting dichroic mirror 51 is extracted by blue transmitting dichroic filter 53 to enter the light valve for B signal. The B light is modulated to light having an image signal of B signal to be reflected. Then the light travels again through the blue transmitting dichroic filter 53 and then through the green reflecting dichroic mirror 51 to enter the polarization beam splitter 11', in which only the signal component is extracted to be outputted. As a result, the signal components R, G, B are synthesized by the polarization beam splitter 11' and the synthetic light is outputted to be enlarged and projected through projection lens 14 onto a screen not illustrated. Unwanted light components are outputted along the direction of the source light, so that they are not mixed in the synthetic light.

The components of the optical system including these reflection type light valves and polarization beam splitter were mounted individually on a mounting base, e.g. on a mounting base forming a floor member of a housing of the apparatus, thereby achieving the desired placement among the components. In other words, this conventional projection type display apparatus had the structure in which the components were fixed to each other through the mounting base and in which the positional relation among the components was determined through the mounting base. Materials for this mounting base were aluminum alloys, fiber reinforced resins, and so on, which were light in weight and had high workability.

SUMMARY OF THE INVENTION

This structure, however, had the problem of occurrence of so-called registration deviation that the base experienced elongation or distortion with change in the ambient temperature during operation to cause deviation of positional relation among the optical members, so as to alter positions of respective color pixels relative to each other on the screen. Particularly, in the case of the recent projection type display apparatus for projection onto a large screen, the registration deviation heavily degraded the projected image, which was a serious problem.

The present invention has been accomplished under the above-described circumstances and an object of the present invention is to provide an optical system for projection type display apparatus that can reduce the registration deviation, thereby improving the quality of projected image.

The inventors contemplated that the above registration deviation occurred as follows; the floor member on which the above-stated light valves, analyzing optical system, and color synthesizing optical system were fixedly mounted experienced expansion and contraction with change in the ambient temperature to change the positions of the components mounted thereon, so that the pixels of the respective colors deviated from their original positions achieved by initial positioning.

First of all, in order to decrease the expansion and contraction of the floor member due to the temperature change, a conceivable way is to select a material having a small thermal expansion coefficient for the floor member. In general, iron-based materials as a typical example of such material have a drawback of large weight and thus are not used easily. Further, nickel alloys typified by invar with small thermal expansion coefficient reveal poor workability and are very expensive.

The inventors considered that the above problem could be solved while using the conventional aluminum alloys or fiber reinforced resins as the material for the floor member, and accomplished the present invention.

As a result, the inventors found that the aforementioned registration deviation was reduced by integrally forming the optical system through which the modulated light beams emitted from the respective light valves traveled to be color-synthesized and outputted and that, further by fixing a member closest to the projection lens out of the thus integrated members to the floor member, focus deviation of projected image was also reduced in combination with the integration effect. This is because the change in distance with temperature change becomes ignorable when the distance is small between the fixed member and the projection lens fixed to the floor member.

The present invention provides an analyzing-synthesizing optical system unit for projection image display apparatus in which beams of the three primary colors of R, G, and B are modulated by respective, dedicated polarization beam splitters and light valves, the modulated beams are extracted, and a synthesizing optical system synthesizes the three color beams to output synthetic light, wherein the light valves and the polarization beam splitters are fixed as integrated with the synthesizing optical system and wherein optical path lengths of optical paths for the respective colors, established by each light valve, each polarization beam splitter, and the synthesizing optical system, are approximately equal to each other.

In this structure, the members constituting each optical path are integrated without intervention of the mounting base, so that the positional relation among the components is independent of the mounting base. With change in the ambient temperature, the relative positional deviation between the light valves will result from only deviation caused by dimensional change of the members including the light valves, polarization beam splitters, and so on, and is completely free of the expansion and contraction of the mounting base accordingly. Therefore, amounts of the deviation can be reduced remarkably when compared with the deviation due to the thermal expansion coefficient of the projection type display apparatus as in the conventional projection type display apparatus described above. Further, amounts of the deviation caused by the dimensional change of the members are almost equal because of the approximately equal path lengths, so that the effect thereof is further relaxed. Therefore, even if the material for the mounting base is selected from the aluminum alloys and the fiber reinforced resins with relatively large thermal expansion coefficients in view of the weight reduction, workability, and cost, the registration deviation can be reduced largely and the quality of projected image can be improved, as compared with the conventional projection type display apparatus.

The present invention also offers an optical system unit for projection image display apparatus in which incident white light is polarized and separated by a polarization beam splitter to be separated into beams of the three primary colors of R, G, and B by a separating-synthesizing optical system, the beams are modulated by respective, dedicated light valves, the modulated beams are synthesized again by the aforementioned separating-synthesizing optical system, and only the modulated light is extracted by the above polarization beam splitter, wherein the light valves and the polarization beam splitter are fixed as integrated with the synthesizing optical system and wherein optical path lengths of optical paths of the respective colors, established by each light valve and the separating-synthesizing optical system, are approximately equal to each other.

In this case, the separating optical system is also integrated, which is further preferable. This also has the effect of making the entire optical system compact.

When these optical systems are applied to the projection type display apparatus, the projection type display apparatus can be achieved with less registration deviation and less focus deviation. The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
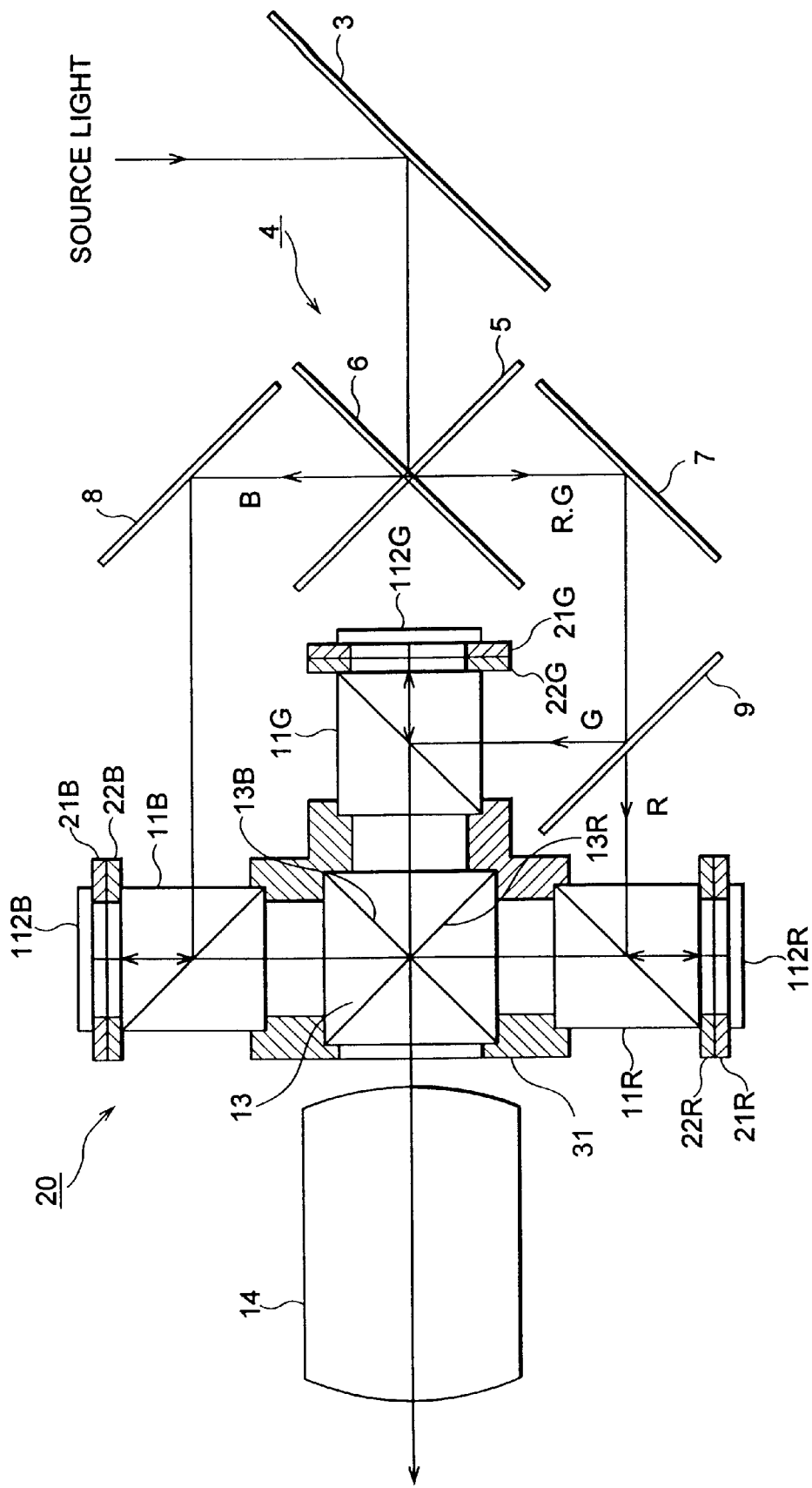
FIG. 1 is an overall schematic diagram to show an optical path configuration of the first embodiment of the present invention.

Several preferred embodiments of the present invention will be described in detail by reference to the accompanying drawings. To facilitate the comprehension of the explanation, the same components will be denoted by the same reference numerals in the drawings as much as possible, and redundant description will be omitted.

[First Embodiment]

FIG. 1 is a schematic diagram to show the overall structure of the first embodiment according to the present invention.

This projection type display apparatus is mainly composed of a trichromatic separation optical system for separating the source light into beams of the three primary colors R, G, and B and an analyzing-synthesizing optical system for producing projected images of the respective colors and synthesizing them. Among them, the trichromatic separation optical system is composed of a mirror 3 for guiding the source light, a cross dichroic mirror 4 for separating the B light from the mixed light of G light and R light, disposed on the exit optic axis of the mirror 3, a mirror 8 for guiding this B light to the analyzing-synthesizing optical system, disposed on the optic axis of the B light after the separation, a mirror 7 for changing a traveling direction of light, disposed on the optic axis of the mixed light of G light and R light after the separation, and a dichroic mirror 9 having such characteristics as to reflect the G light and transmit the R light. This cross dichroic mirror 4 is constructed in the X-configuration consisting of a dichroic mirror 5 having such characteristics as to reflect the B light and transmit the G light and R light and a dichroic mirror 6 having such characteristics as to reflect the G light and R light and transmit the B light, intersecting with each other.

Figure 2:
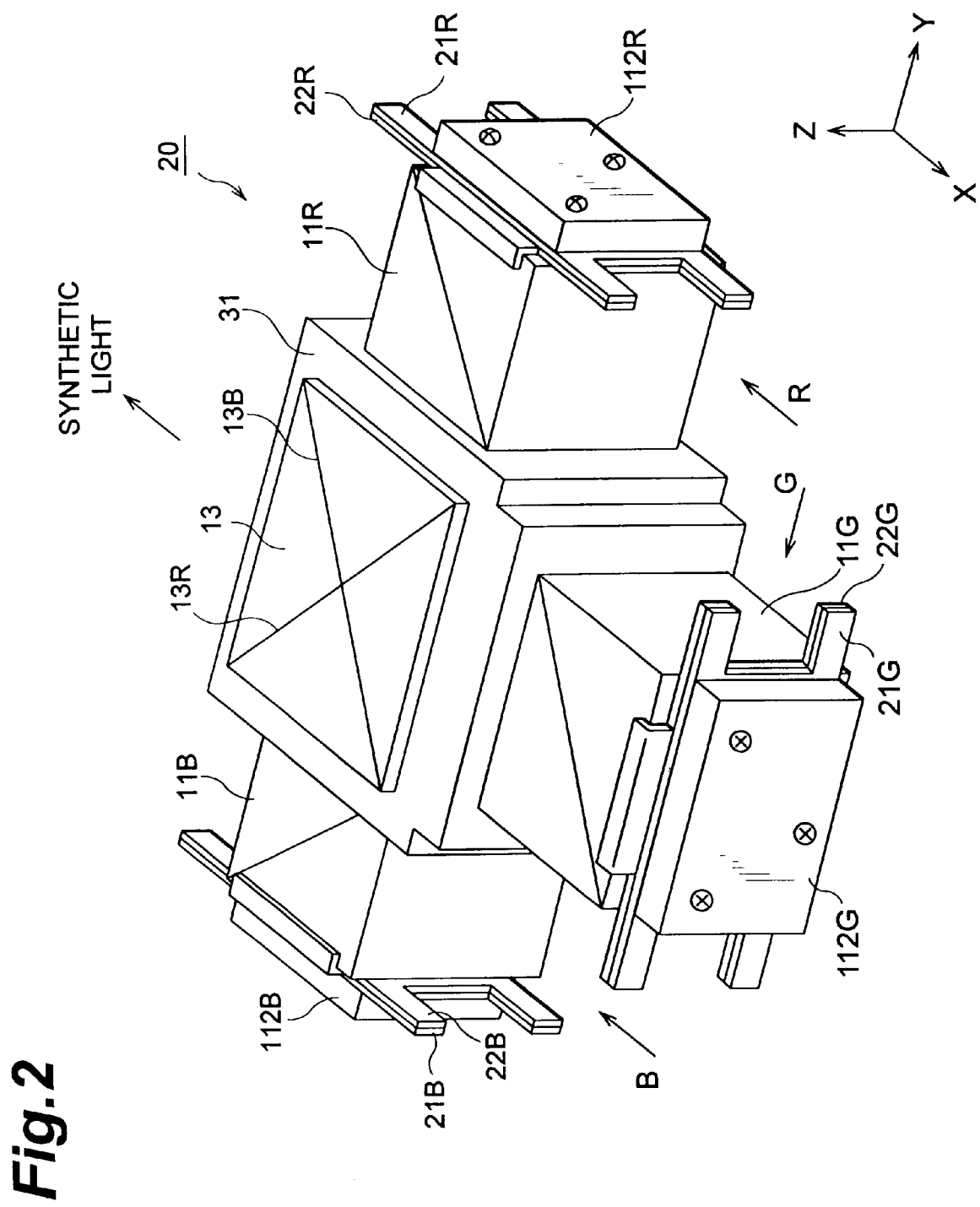
FIG. 2 is a perspective view of the configuration of the first embodiment.

The analyzing-synthesizing optical system 20, as shown in the perspective view thereof in FIG. 2, is constructed by integrating light valves 112R, 112G, 112B for the respective color beams, polarization beam splitters (PBSs) 11R, 11G, 11B, and a cross dichroic prism 13 for synthesis. For convenience' sake of description, the mutually orthogonal coordinate axes X, Y, and Z are defined as illustrated (which are also used in each of the drawings which follow).

The cross dichroic prism 13 has such structure that four rectangular equilateral triangle prisms having a common refractive index, which have R light reflecting dichroic film 13R or B light reflecting dichroic film 13B of a dielectric multilayer film on their predetermined slant faces, are combined with each other with their right-angle parts being joined and that they are bonded with an adhesive in a perpendicularly crossing pattern of X-shape of the R light reflecting dichroic film 13R and B light reflecting dichroic film 13B.

The PBSs 11R, 11G, 11B have the structure in which a polarization separating film made of a dichroic multilayer film designed and formed for each color light is deposited by physical vapor deposition such as vacuum vapor deposition on a bottom surface of one of two optical glass prisms having the cross-sectional shape of a rectangular equilateral triangle and a common index of refraction and in which the film surface is bonded to a bottom surface of the other prism with an adhesive. They are secured by holding member 31 in such arrangement that the PBS 11R for R color and the PBS 11B for B color are opposed to each other on either side of this cross dichroic prism 13 and that the PBS 11G for G color is located perpendicular thereto. In this case, each polarization separating film of the PBS 11R, 11G, or 11B is located so as to reflect one polarization component of the R light, G light, or B light and make it travel in the Y-direction, in the X-direction, or in the −Y-didirection, respectively, i.e., away from the cross dichroic prism 13.

Further, each light valve 112R, 112G, 112B is attached through mounting member 21R, 21G, 21B and mount member 22R, 22G, 22B to the PBS for each color 11R, 11G, 11B. The surface of the cross dichroic prism 13 opposite to the surface facing the PBS 11G is an exit plane of synthetic light. The projection lens 14 is located on the optic axis of the synthetic light as shown in FIG. 1.

Figure 3:
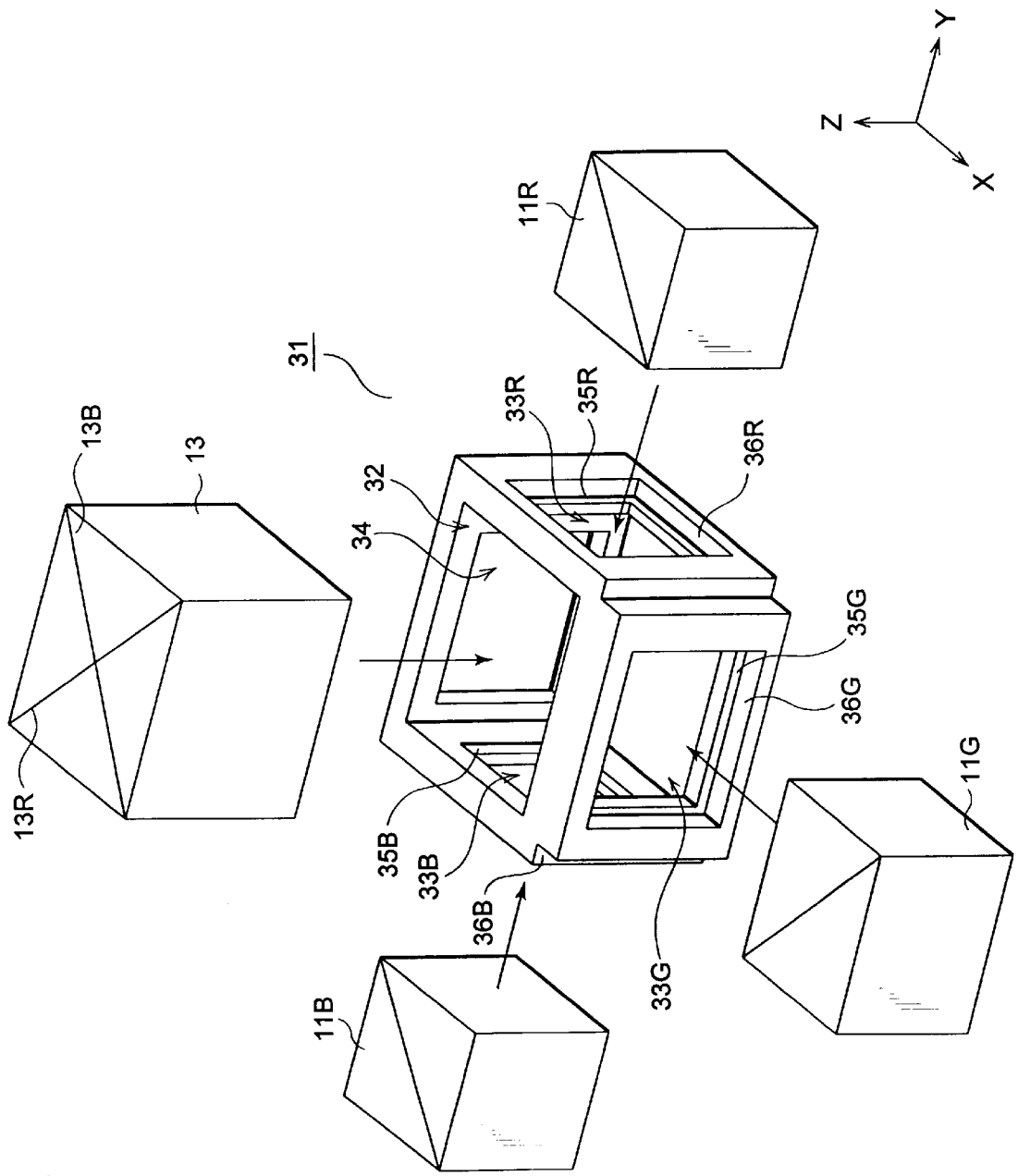
FIG. 3 is a perspective view to show the relation among a cross dichroic prism, three polarization beam splitters, and a member used for integrating them in the first embodiment.

FIG. 3 shows the structure of the holding member 31. The holding member 31 is formed basically in a rectangular solid shape and has a space for housing the dichroic prism 13 for synthesis of color inside thereof. This holding member 31 is molded by diecasting of aluminum and is treated by a surface blacking treatment such as a black alumite treatment for keeping the predetermined shape and for preventing scattering of incident light. The holding member 31 has an aperture 32 as an entrance through which the dichroic prism 13 for synthesis of color is set into this space, in the top surface (in the Z-direction). Namely, the dichroic prism 13 is guided through the aperture 32 from above to inside the holding member 31 as shown in FIG. 3 and the four corner ridges of the dichroic prism 13 are fixed to portions of the holding member 31 facing thereto with an adhesive.

Further, this holding member 31 is constructed in the structure having apertures 33R, 33B, 33G, 34 in the Y-direction, the −Y-didirection, the X-direction, and the −X-direction as well, and these apertures are open to the above-stated space for housing the cross dichroic prism 13. Among these apertures, the X-directional, Y-directional, and −Y-didirectional apertures 33G, 33R, 33B are provided for guiding the modulated light from each color light valve 112G, 112R, 112B (see FIG. 1 and FIG. 2), transmitted by each color light PBS 11G, 11R, 11B, to the cross dichroic prism 13. Each of members 35R, 35B, 35G forming an external frame of these apertures 33R, 33B, 33G functions as a stopper for positioning each color PBS 11R, 11G, 11B so as to prevent positional deviation thereof in the −Y-didirection, in the −X-direction, or in the Y-direction, respectively. Further, the holding member body 31 is provided with holding portions 36R, 36B, 36G projecting in the Y-direction, in the −Y-didirection, and in the X-direction, respectively, so as to locate and fix each PBS 11R, 11G, 11B at the position where each PBS is positioned. A tip portion of each PBS 11R, 11G, 11B is put into each holding portion 36R, 36B, 36G to be bonded and fixed, thereby being integrated therewith.

Figure 4:
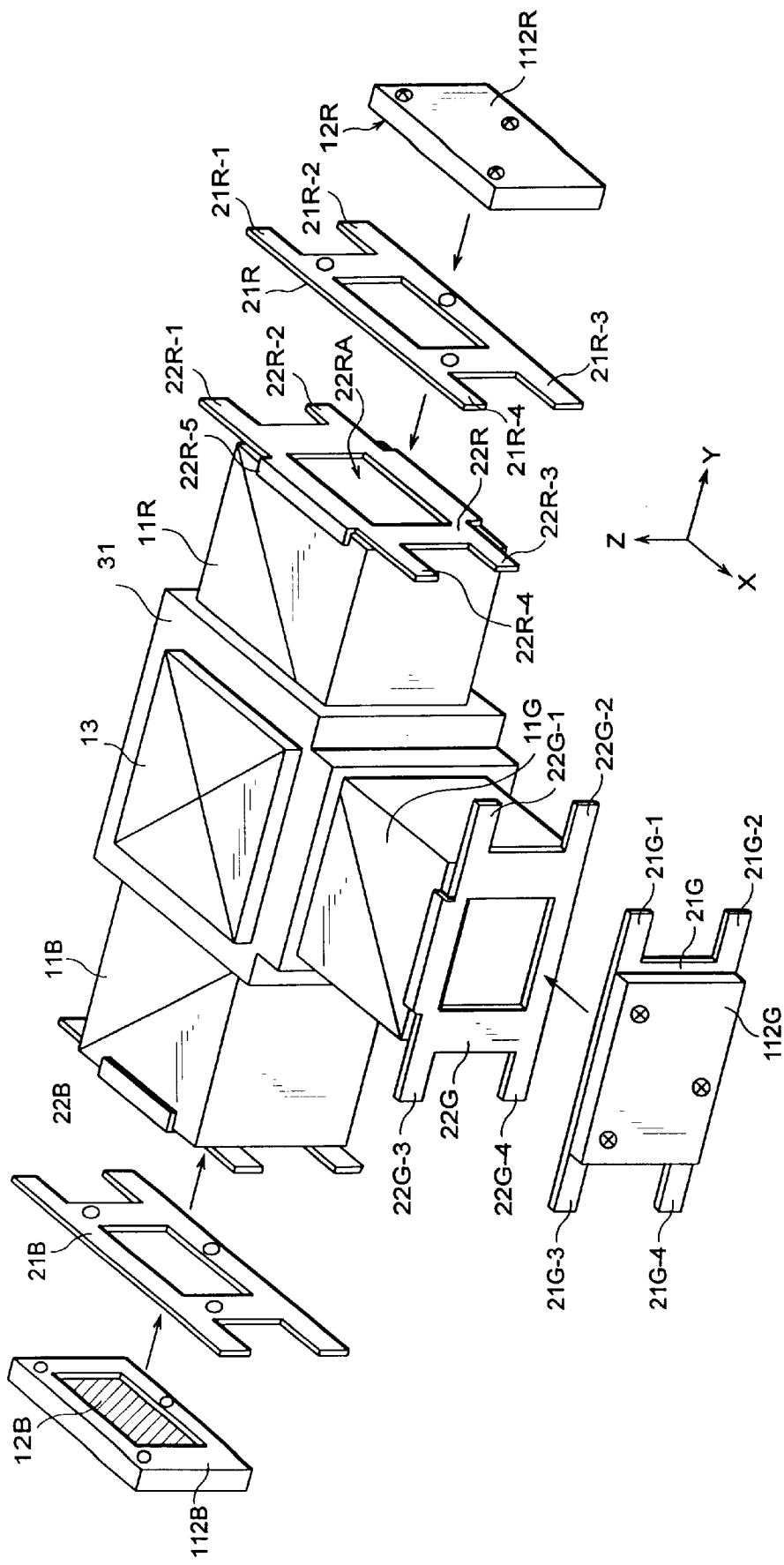
FIG. 4 is a perspective view to show a joint state between the light valves and the polarization beam splitters in the first embodiment.

FIG. 4 is a drawing to show a process for attaching the light valves 112R, 112B, 112G for the respective colors to the member incorporating the dichroic prism 13 and the PBSs 11R, 11B, 11G for the respective colors as described above. The first mounting member 22R, 22G, 22B and the second mounting member 21R, 21G, 21B are used for attaching each light valve 112R, 112G, 112B to the corresponding PBS 11R, 11G, 11B as described previously. The following description will be given mainly with an example using the R color PBS 11R, light valve 112R, first mounting member 22R, and second mounting member 21R. The structure for the G color and for the B color is also essentially the same.

The first mounting member 22R is a member made by press working of iron sheet (SPC material), and the entire surface of the member is plated by tin-lead plating. The first mounting member 22R is formed in the shape having an aperture 22RA a little larger than an image forming portion of the light valve 112R, in the almost center portion thereof and having four legs 22R-1, 22R-2, 22R-3, 22R-4 on the side faces, the four legs being soldered to the second mounting member 21R as described below and projecting two in the X-direction and two in the −X-direction. Further, the first mounting member 22R has portions 22R-5, 22R-6 bent and projecting each in the −Y-didirection at the top (Z-directional) and bottom (−Z-directional) edges of the member 22R and in a predetermined width in the X-direction. The first mounting member 22R is mounted on the PBS 11R in the sandwich structure in which the R-light entrance plane of the R light PBS is interposed between these portions 22R-5, 22R-6. The first mounting member 22R is fixed to the PBS 11R in that state with an adhesive. Described herein was the method for attaching the mounting member 22R after the PBS 11R has been mounted on the holding member 31, but the PBS 11R may be fixed to the holding member 31 after the mounting member 22R has been mounted on the PBS 11R prior thereto.

Next described is the second mounting member 21R. This member 21R is made by punching of the same SPC material as the first mounting member 22R and plating the entire surface by tin-lead plating. The shape of the second mounting member is identical to that of the first mounting member in that it has an aperture in the near center and legs 21R-1, 21R-2, 21R-3, 21R-4 on the both sides, but the second mounting member 21R is flat as a whole with no bent portion corresponding to 22R-5, 22R-6 of the first mounting member. The second mounting member 21R is provided with three threaded holes for mounting of the light valve 112R. The second mounting member 21R and light valve 112R need to be preliminarily fixed by screwing by use of the threaded holes and screws.

Now, let us briefly explain the light valve 112R used in the present embodiment.

The light valve 112R is composed of a liquid crystal light valve body 12R and a holding member made of a resin for protecting it, so that the liquid crystal light valve body 12R is protected by the resin member except for its entrance/exit plane. When the light valve 112R is observed from the back, the resin protecting portion appears as shown in FIG. 4; when observed from the front, the entrance/exit plane of the light valve body 12B appears through the aperture as in the light valve 112B shown in FIG. 4. The light valve 112R has holes on the entrance side thereof, for screwing the light valve 112R to the second mounting member 21R.

This light valve body 12R is a reflection type liquid crystal light valve, which is of a type called an electrically addressed reflection type liquid crystal light valve among such reflection type light valves.

The structure of the body, which is not illustrated, consists of, from the entrance plane, a glass substrate, a transparent electrode (ITO; indium tin oxide), a liquid crystal modulation layer, metal electrodes forming the pixels, nonlinear switching elements such as TFTs (thin film transistor), and an Si substrate. When a predetermined voltage is placed between a metal electrode and the transparent electrode by switching of TFT, liquid crystal molecules in the liquid crystal layer change their alignment, so as to function as a modulation layer. This function is utilized. Specifically, when the voltage is applied to the liquid crystal layer by the switching, the liquid crystal molecules in the liquid crystal layer are aligned along the electric field so as to function as a quarter wave plate layer. Because of this function, linearly polarized light entering the pertinent portion is converted to circularly polarized light after passage through the liquid crystal layer. The circularly polarized light is reflected by the aforementioned metal reflecting electrode and again travels through the liquid crystal layer. Then the light emerges from the light valve in the form of linearly polarized light whose oscillation direction is shifted 90° from that of the incident linearly polarized light. When the incident light is s-polarized light (or p-polarized light), the outgoing light is p-polarized light (or s-polarized light). On the other hand, the liquid crystal molecules in the liquid crystal layer are not aligned in portions to which the aforementioned voltage is not applied, but they are oriented following the liquid crystal orientation layer to compose the twisted structure in the thickwise direction of the layer. Therefore, the linearly polarized light incident into such portions travels as being rotated along the twisted structure, and the light is reflected by the metal reflecting electrode. Then the light travels in the opposite direction as also being rotated along the twisted structure, and the light is emergent from the light valve in the form of the same linearly polarized light as upon incidence into the light valve. When the incident light is s-polarized light (or p-polarized light), the outgoing light is also s-polarized light (or p-polarized light). The above described the structure of the electrically addressed reflection type light valve and the function thereof.

This light valve body 12R is not limited to the electrically addressed reflection type light valve, but an optically addressed reflection type light valve may also be adopted.

When the second mounting member 21R with this light valve 112R mounted thereon is fixed to the first mounting member 22R, it is necessary to achieve adjustment with the other light valves 112G, 112B, i.e., to achieve registration among the colors on the light valve bodies 12R, 12B, 12G and conjugateness of each light valve with respect to the projection lens (i.e., the positions of focus should be equal among the light valves). Therefore, each light valve 112R, 112G, 112B is mounted through the second mounting member 21R, 21G, 21B onto the first mounting member while keeping it in an image projecting state.

First, the legs 22G-1 to 22G-4 of the first mounting member 22G are matched with the corresponding legs 21G-1 to 21G-4 of the second mounting member 21G and then the solder on the border is locally heated to solder them with each other, thereby fixing them.

Although the legs of the two members were preliminarily solder-plated, this soldering work will become easier if prior to execution of this work an additional amount of solder is placed on the opposing surfaces of one or both of the first mounting member and the second mounting member.

The local heating can be achieved by temporarily securing the legs of the first mounting member and the second mounting member in an opposing state and irradiating the legs with laser to sweat the solder. After that, the sweat solder becomes adhering to the solder preliminarily deposited by tin-lead plating and soldering is achieved by cooling it.

Since this work is carried out between the legs of the projecting structure on the both sides of the first holding member and second holding member, they can be soldered at the portions apart from the light valve and PBS, whereby this structure can minimize the effect of increase in temperature due to the soldering.

Since the light valve body itself does not have high heat resistance at all, the soldering by this structure is very effective.

Next, the first mounting member 22R and second mounting member 21R are coupled by soldering. On this occasion, the soldering is carried out while adjusting the position of soldering and the thickness of solder so as to achieve coincidence of registration between the pixels of the G light and R light over the entire surface and achieve the focus at the same position.

Further, the first mounting member 22B and second mounting member 21B are coupled by soldering so as to achieve coincidence of registration of the pixels of B light with their corresponding pixels of R light and G light, having already been aligned with each other.

The above achieves registration of the light valves 112R, 112B, 112G and conjugateness with respect to the projection lens.

This work may be one conducted after mounting of the projection lens of the projection apparatus, but the projection apparatus may be assembled in such a way that a dedicated jig is produced, the integrated, analyzing-synthesizing optical system 20 of the present embodiment shown in FIG. 2 is constructed thereby, and the projection apparatus is assembled using the integrated optical system.

The analyzing-synthesizing optical system 20 shown in FIG. 2, produced as described above, is fixed by attaching only the holding member 31 to the floor part of the housing of the projection apparatus. This fixing may be effected by bonding or by preliminarily making threaded portions at the four corners of the bottom portion of this holding member 31 and screwing it to the floor portion through the threaded portions. This locates the analyzing-synthesizing optical system 20 relative to the trichromatic separation optical system and projection lens 14 as shown in FIG. 1.

Next, the operation of this apparatus will be described referring to FIG. 1. The source light emitted from the light source not illustrated turns its traveling direction at the mirror 3 to enter the cross dichroic mirror 4 and to be split into the B light and the mixed light of R and G light. Among the split beams, the mixed light of R light and G light is guided to the dichroic mirror 9 by the mirror 7 to be split into the G light and the R light. This G light or R light is incident to the PBS 11G or 11R, respectively. On the other hand, the B light split by the cross dichroic mirror 4 is made incident to the PBS 11B by the mirror 8.

The polarization separating portion of each PBS 11R, 11G, 11B separates the light into polarization components by reflecting light of only one specific polarization component and transmitting light of the other polarization component. Only the polarization component reflected is made incident to the light valve 112B, 112G, 112R placed for each color light. The reflected light emerging from the light valve, including light modulated by a signal of each color light, is again incident to each PBS 11R, 11G, 11B. The polarization separating portion of PBS transmits the polarization component different from the reflected polarization component, i.e., transmits only the modulated light or analyzes the light to output only the modulated light. These beams are incident through the different entrance surfaces for the respective colors into the cross dichroic prism 13 forming the color synthesizing optical system. The B light reflecting dichroic film 13B and the R light reflecting dichroic film 13R placed in the X-shape in the cross dichroic prism 13 reflect the B light and the R light, respectively, and transmit the G light, thus achieving synthesis of the three colors. The thus synthetic light is emitted from the prism and the projection lens 14 enlarges the image to project the enlarged, full color image onto the screen not illustrated.

In the conventional projection apparatus, the analyzing-synthesizing optical system was not axially symmetric with respect to the optic axis and the components were fixed individually to the floor member; therefore, this structure gave rise to deviation in the normal direction to the optic axis of the light valve with change in temperature, so as to result in deviation of registration. When the analyzing-synthesizing optical system described in the present embodiment is applied to the projection type display apparatus, the light valves, PBSs, and dichroic prism are axially symmetric with respect to the optic axis and the axially symmetric structure is maintained even with change in temperature, however; therefore, the light valves will shift along the direction of the optic axis, but will never shift in the normal direction to the optic axis. Hence amounts of the deviation can be reduced largely as compared with the conventional structure, so that the registration deviation can be reduced.

When environment resistance of the projection type display apparatus is taken into account, to use a glass material having a small photoelastic constant (the photoelastic constant not more than $1.5 \times 108$ cm$^2$/N) as a glass material for the three PBSs of the analyzing-synthesizing optical system unit described above is very effective in order to obtain a good projected image, because such glass material reveals less occurrence of birefringence caused by change in the ambient temperature, stress appearing during mounting, or the like and is thus free of illuminance nonuniformity, so as to enhance the contrast of projected image.

[Second Embodiment]

The basic form of the second embodiment of the present invention will be described next referring to FIG. 5 and FIG. 6.

Figure 5:
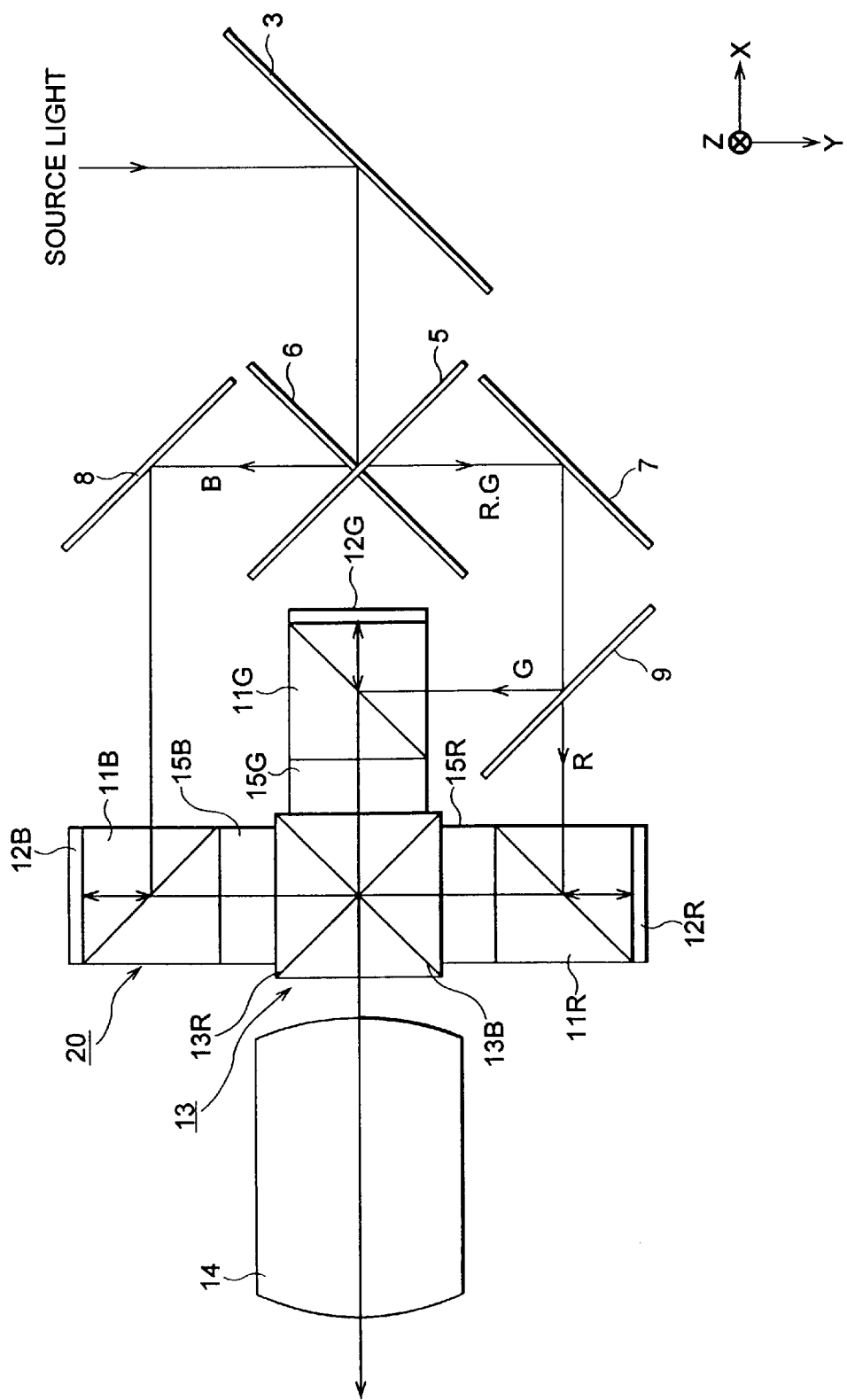
FIG. 5 is an overall schematic diagram to show an optical path configuration of the second embodiment of the present invention.

FIG. 5 is a schematic, structural drawing to show the projection type display apparatus of the present embodiment. FIG. 6 is a schematic, perspective view to show the analyzing-synthesizing optical system 20 in the projection type display apparatus shown in FIG. 5.

The fundamental structure of this projection type display apparatus is the same as in the first embodiment shown in FIG. 1. The second embodiment is different from the first embodiment in that the light valves 12R, 12B, 12G are fixed directly to the respective PBSs 11R, 11G, 11B with an adhesive and in that the PBSs 11R, 11G, 11B and the cross dichroic prism 13 are coupled without using the constituent member 31 but they are fixed through path length correcting member 15R, 15G, 15B with an adhesive.

These path length correcting members 15R, 15G, 15B are optical glass members of a rectangular solid shape having a predetermined thickness.

Figure 6:
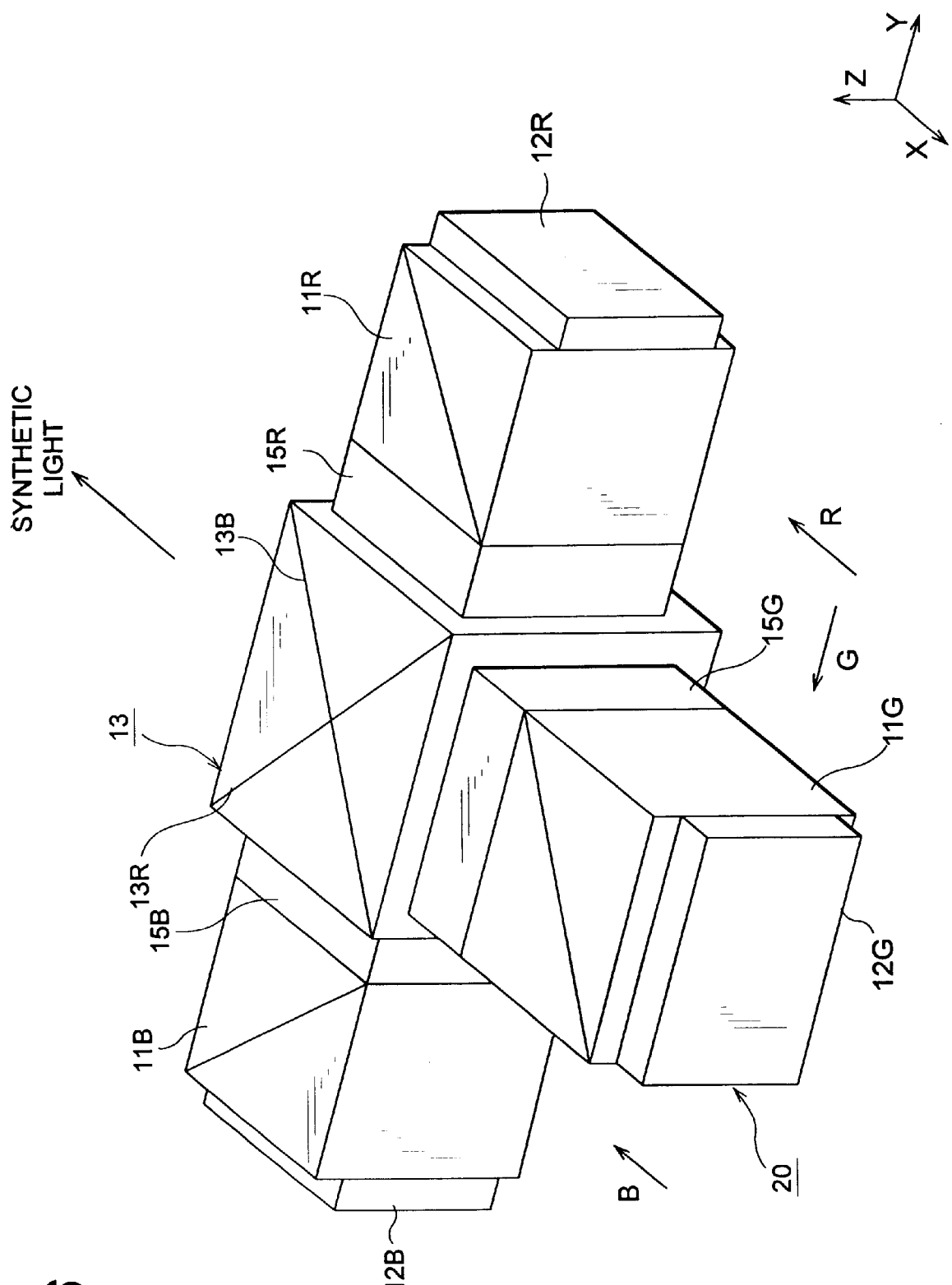
FIG. 6 is a perspective view of the configuration of the second embodiment.

In the present embodiment, as shown in FIG. 5 and FIG. 6 (particularly, in FIG. 5), the analyzing-synthesizing optical block 20 is made by integrating the PBSs 11R, 11G, 22B, the light valves 12R, 12G, 12B, the cross dichroic prism 13, and the path length correcting members 15R, 15G, 15B without intervention of the mounting base (not illustrated). Namely, these elements 11R, 11G, 11B, 12R, 12G, 12B, 13, 15 are bonded with an adhesive to be integrated in the present embodiment. Specifically, the path length correcting member 15R, 15G, 15B is bonded to the entrance surface for each color light of the cross dichroic prism 13 with an adhesive and a predetermined surface of each color light PBS 11R, 11G, 11B is bonded to the surface opposite to the bond surface of the corresponding path length correcting member 15R, 15G, 15B. Further, the entrance surface of each light valve 12R, 12G, 12B is bonded to the surface opposite to the bond surface of each PBS 11R, 11G, 11B with an adhesive.

The thicknesses of these path length correcting members 15R, 15G, 15B are adjusted as follows; the dimensions of the PBSs 11R, 11G, 11B and the cross dichroic prism 13 are preliminarily measured and the optical path lengths are made nearly equal to each other from the bond surface of each PBS 11R, 11G, 11B bonded to the light valve 12R, 12G, 12B up to the exit plane of the cross dichroic prism 13.

Although not illustrated in the drawings, the analyzing-synthesizing optical block 20 is mounted as fixed to the mounting base, for example to such a mounting base as the floor member forming the housing of the apparatus of the present embodiment. This means that the elements 11R, 11G, 11B, 12R, 12G, 12B, 15 except for the cross dichroic prism 13 of the analyzing-synthesizing optical block 20 are fixed through the cross dichroic prism 13 to the mounting base. This fixing can be made, for example, by bonding only the bottom surface of the cross dichroic prism 13 to the mounting base with an adhesive or the like or by attaching only the bottom part of the cross dichroic prism 13 to the mounting base with a mounting bracket.

As a matter of fact, the analyzing-synthesizing optical block 20 may be fixed to the mounting base by fixing only either one of the elements 11R, 11G, 11B, 12R, 12G, 12B, 15 except for the cross dichroic prism 13. It is more preferable, however, to employ the fixing way of the present embodiment in which the cross dichroic prism 13 is fixed directly to the mounting base and in which the other components 11R, 11G, 11B, 12R, 12G, 12B, 15 are fixed through the cross dichroic prism to the mounting base, because this structure can decrease the focus deviation of projected image.

This is from the following reason; since the projection lens 14 is fixed to the mounting base separately from the analyzing-synthesizing optical block 20, the positional relation between the projection lens 14 and the analyzing-synthesizing optical block 20 is determined through the mounting base. Consequently, the positional relation between the projection lens 14 and the analyzing-synthesizing optical block 20 varies depending upon expansion or contraction of the mounting base with change in the ambient temperature, and the focus deviation of projected image occurs according thereto. When the cross dichroic prism 13 closest to the projection lens 14 out of the components of the integrated block 20 is fixed directly to the mounting base as in the present embodiment, the distance is small between the fixing position of the projection lens 14 and the fixing position of the analyzing-synthesizing optical block 20 in the mounting base, however. In that case, the change is small in relative positional relation between the projection lens 14 and the integrated block 20 with change in the ambient temperature even in the case of a material having a relatively large thermal expansion coefficient being used as a material for the mounting base. As a result, the focal deviation of projected image is also decreased. Particularly, if the distance is sufficiently small between the projection lens 14 and the cross dichroic prism 13, the focal deviation of projected image with change in the ambient temperature will become negligible.

The present embodiment also requires the so-called registration adjustment for aligning the corresponding pixels of the respective light valves 12R, 12G, 12B on the projected image, as in the first embodiment. This will be described below.

After the cross dichroic prism 13 is bonded to the path length correcting members 15R, 15G, 15B, the path length correcting member 15R, 15G, 15B and PBS 11R, 11G, 11B are bonded to each other with predetermined accuracy. Then the light valve 12G for G light is accurately bonded to the G light PBS 11G, for example, with an ultraviolet curing adhesive. In this state light is then guided so that only the G light is projected onto the screen; and the light valve 12G for G light is driven to project a projection image for adjustment (for example, a color chart) by only the G light onto the screen.

Then the light valve 12R for R light (or the light valve 12B for B light) is held on the R light PBS 11R without curing the ultraviolet curing adhesive and light is guided so that a projected image by the R light is also projected onto the screen. The projected image by the R light is also projected onto the screen. The light valve 12R is moved by a small amount so as to achieve registration of the pixels for R light with respect to the pixels for the G light, and it is then fixed. While keeping this state, the adhesive is exposed to ultraviolet light to be cured, whereby the light valve 12R is bonded to the PBS 11R.

After that, the light valve 12B for B light is also bonded to the PBS 11B with the ultraviolet curing adhesive by the same procedures, thus producing the analyzing-synthesizing optical block 20 while achieving the registration adjustment among the R light, G light, and B light.

In the projection type display apparatus of the present embodiment, the optical system through which the modulated beams of the respective colors emitted from the corresponding light valves 12R, 12G, 12B travel through the analyzing step, color synthesis, and emission, is integral without intervention of the mounting base and the positional relation among the elements 11R, 11G, 11B, 12R, 12G, 12B, 13, 15 constituting this optical system is independent of the mounting base. With change in the ambient temperature, deviation of relative positions among the light valves 12R, 12G, 12B is only deviation caused by dimensional change of glasses for the light valves 12R, 12G, 12B, PBSs 11R, 11G, 11B, path length correcting members 15R, 15G, 15B, and cross dichroic prism 13 composing the analyzing-synthesizing optical block 20 accordingly. The deviation is completely free of the expansion and contraction of the mounting base, so that the deviation of optic axis can be reduced greatly as compared with the conventional projection type display apparatus. This permits the present embodiment to adopt the aluminum alloys, the fiber reinforced resins, etc. having relatively large thermal expansion coefficients while being light in weight, high in workability, and low in cost, as the material for the mounting base; even under this condition the registration deviation can be reduced largely and the quality of projected image can be improved.

Figure 7:
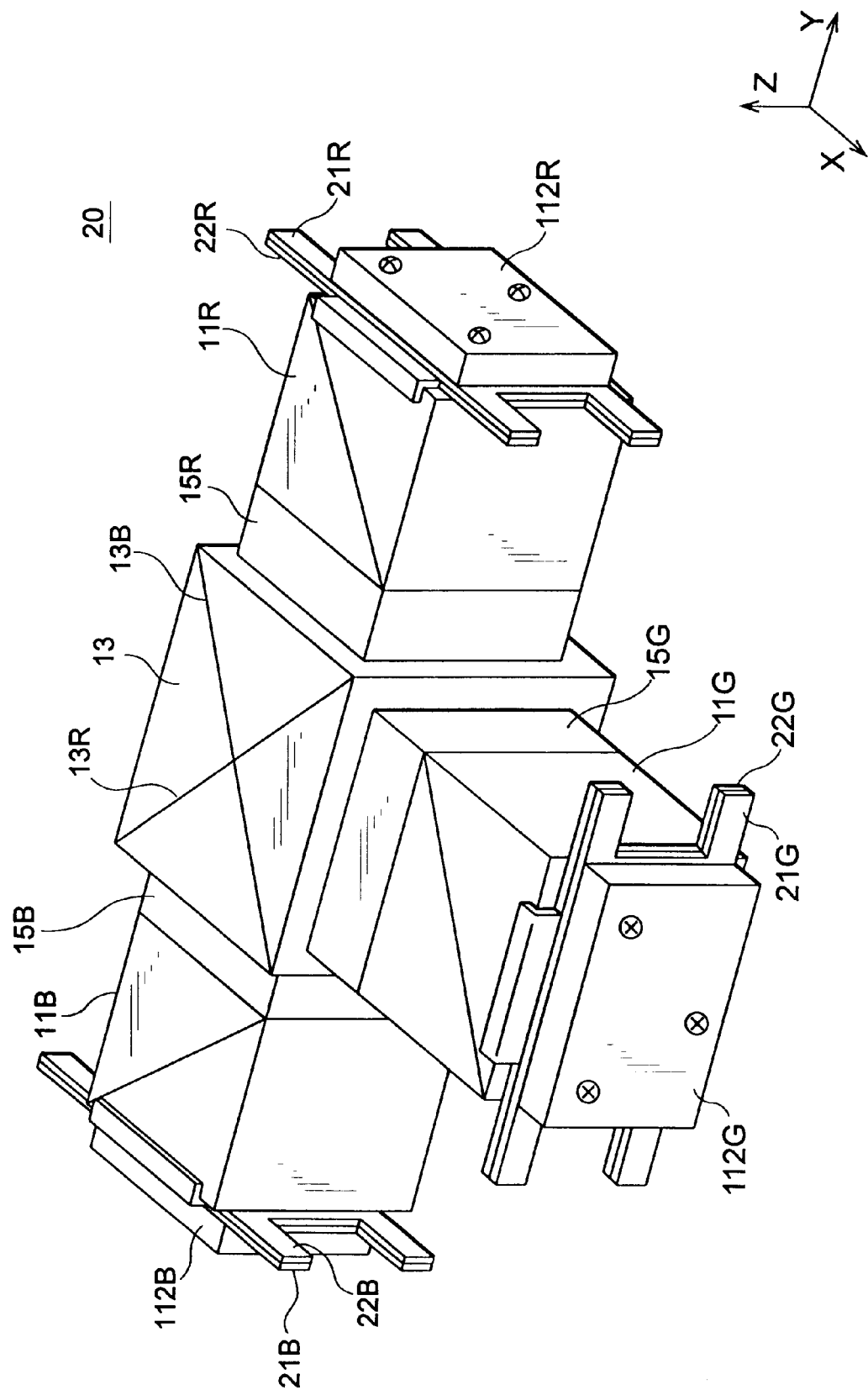
FIG. 7 is a perspective view to show the structure of a modification of the second embodiment.

FIG. 7 is a perspective, structural drawing to show a modification of the analyzing-synthesizing optical block of the second embodiment. This modification is different from the second embodiment described above in connection between each light valve and PBS part. This modification is characterized by using the same fixing method as in the first embodiment shown in FIG. 2. A method for producing this modification is basically a combination of the production methods of the first embodiment and the second embodiment, and the functions and features thereof are the same as those of the second embodiment. Therefore, the detailed description is omitted herein.

Figure 8:
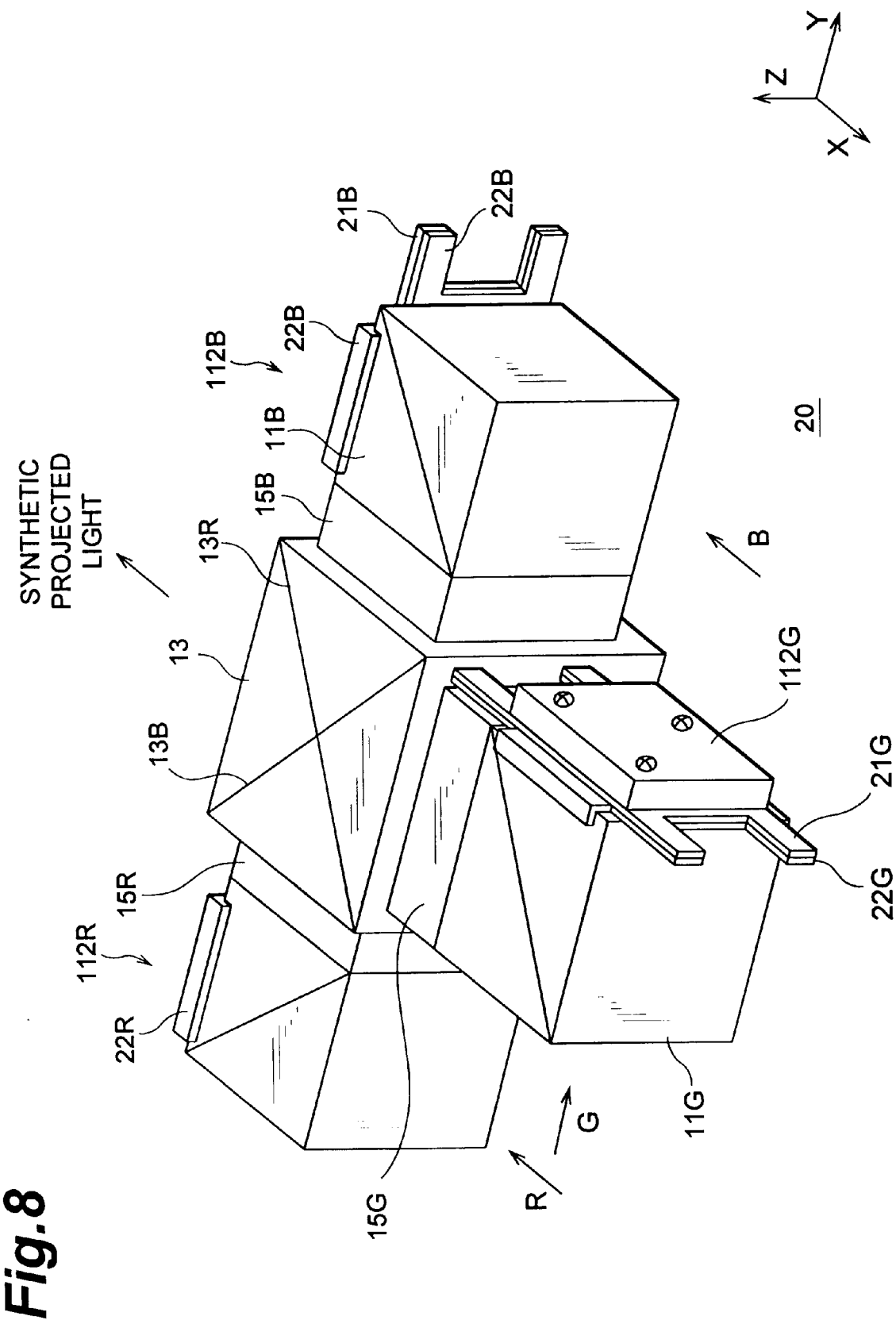
FIG. 8 is a perspective view to show the structure of another modification of the second embodiment.

FIG. 8 is a perspective view to show the structure of still another modification. This modification has the structure in which the light transmitted by the polarization separating film of PBS, out of the light incident to each color PBS 11R, 11G, 11B, is guided to each light valve 112R, 112G, 112B to be modulated, achieved by modifying the structure of the foregoing modification.

Specifically, the R light is incident to the PBS 11R in the −X-direction, the polarization component transmitted by the polarization separating portion of PBS 11R is incident to the light valve 112R, the light modulated and reflected thereby is incident again into the PBS 11R, only the modulated light is reflected (or analyzed) by the polarization separating portion of the PBS 11R, the modulated light then travels in the Y-direction, and the modulated light travels through the path length adjusting member 15R into the cross dichroic prism 13.

The B light and the G light is also modulated in the same manner and only the modulated light (analytic light) travels through the associated path length adjusting member 15B or 15G into the cross dichroic prism 13 in the −Y-didirection or in the −X-direction, respectively.

The beams incident into the cross dichroic prisms 13 are synthesized by the R light reflecting dichroic film 13R and the B light reflecting dichroic film 13B arranged in the X-shape in the dichroic prism 13, and the synthesized light is emitted as projected synthetic light in the −X-direction.

In this modification the legs of the first mounting member 21R, 21G, 21B and the second mounting member 22R, 22G, 22B project on the left and right sides of the mounting members; they will not pose a problem on the occasion of placement of these mounting members, because the path length adjusting member 15R, 15G, or 15B is interposed between the cross dichroic prism 13 and them.

In this modification shown in FIG. 8 the legs of the mounting members project in the ±X-directions and in the ±Y-directions; but these legs can be arranged to project all in the ±z-directions. When this structure is employed, the projecting portions of each first mounting member 22R, 22G, or 22B for holding the PBS 11R, 11G, or 11B is between may be formed between the legs. This is effective where the members 15R, 15G, 15B are thin in the direction of optical path length.

This modification requires higher mounting accuracy of each color PBS than the embodiments and modification described above. The reason is as follows; if the PBS has rotational variation around the Z-axis of the drawing, deviation of optic axis will be two times larger in this modification than that of the first embodiment and the foregoing modification, because the analytic light is reflected in the PBS.

Figure 9:
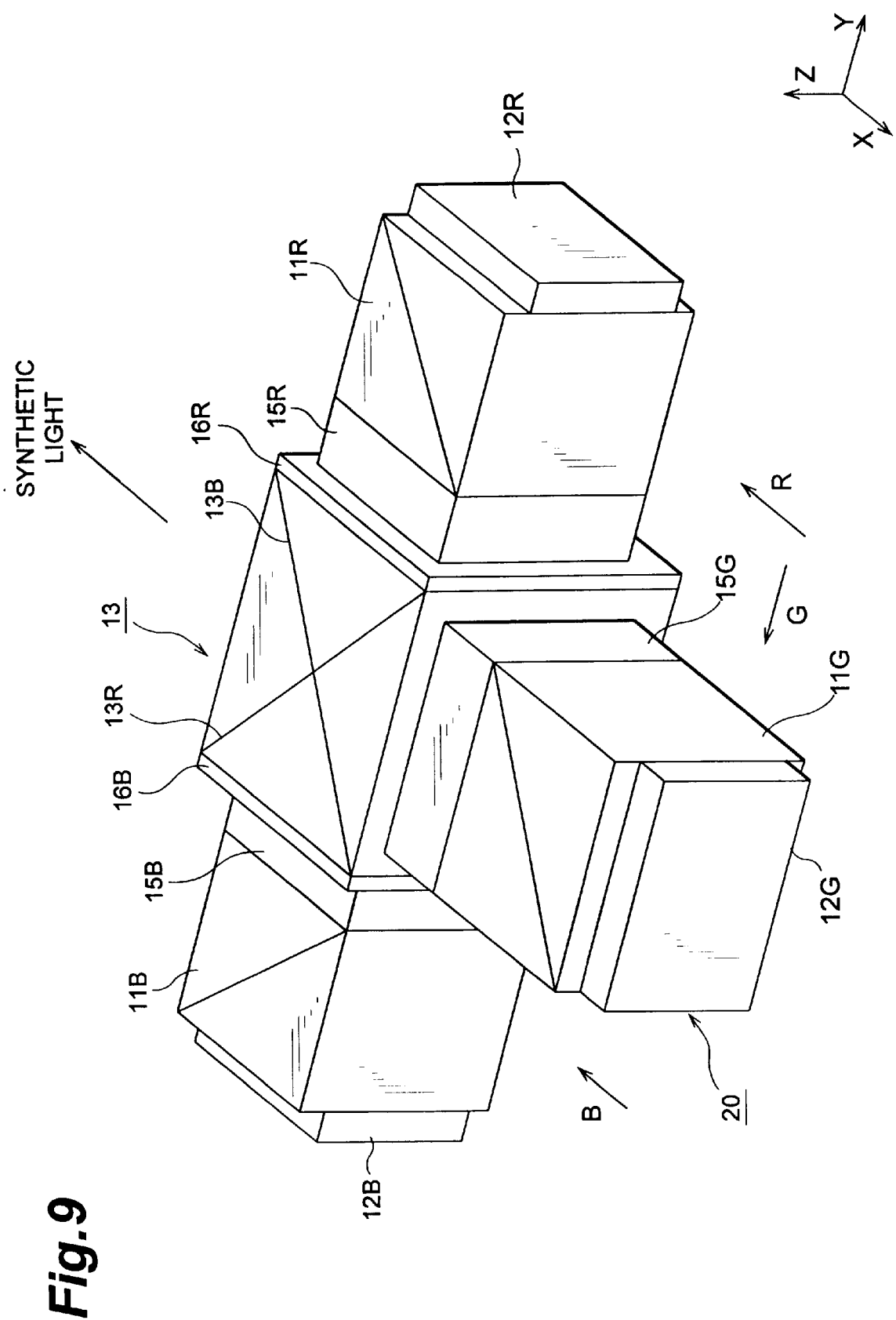
FIG. 9 is a perspective view to show still another modification of the second embodiment.

Still another modification of the second embodiment will be described next referring to FIG. 9. FIG. 9 is a schematic, perspective view to show the analyzing-synthesizing optical block 20 of this modification.

This modification is different from the second embodiment shown in FIG. 6 in that a half wave plate 16R or 16B is placed between the path length correcting member 15R or 15B and the cross dichroic prism 13.

The purpose of placing these half wave plates 16R, 16B is as follows. The R light reflecting dichroic film 13R and the B light reflecting dichroic film 13B arranged in the X-shape in the cross dichroic prism 13 have different reflecting characteristics depending upon the oscillating direction of polarization of light incident to the films 13R, 13B, and utilization efficiency of light is higher when polarized light with higher reflectivity is made incident thereto. It also becomes possible to broaden the wavelength region of reflected light. Each half wave plate 16R, 16B functions to change the oscillating direction of polarized light of the R light or the B light outgoing through the polarization beam splitter 11R or 11G. As for the G light color-synthesized with the R light and B light through the cross dichroic prism 13, the half wave plate is not placed, because the transmission wavelength range can be utilized more widely and effectively when the transmitted light is made incident without changing the polarization direction with respect to the dichroic films 13R, 13B, conversely.

The analyzing-synthesizing optical block 20 in this modification can also be produced by the same method as that of the second embodiment described previously. It is, however, preferable that the half wave plates 16R, 16B be preliminarily bonded to the R light entrance surface and to the B light entrance surface of the cross dichroic prism 13, respectively. The fixing of the other members thereafter, and the registration adjusting method of each light valve 12R, 12G, 12B are the same as those described above.

This modification achieves the same advantages as the second embodiment described above and, in addition, can change the polarization state of each color light incident to the cross dichroic prism 13 into the polarization state in which the cross dichroic prism 13 can color-synthesize the color beams with highest efficiency, so that a bright projected image can be obtained with high luminance.

In this case, however, the polarization direction of the R light and B light included in the synthetic light is different from that of the G light and, therefore, a polarizing screen cannot be used as a projection screen. In order to increase the efficiency of color synthesis in the cross dichroic prism 13 to some extent while using the polarizing screen, a half wave plate is also interposed between the cross dichroic prism 13 and the PBS 11G so as to align the polarization directions of the all color beams incident to the cross dichroic prism 13 with each other.

In this modification the half wave plates 16R, 16B are placed in the optical paths of the R light and the B light, respectively, and it is a matter of course that the thicknesses of the path length correcting members 15R, 15G, 15B should be adjusted so as to keep the optical path lengths of the respective optical paths almost equal to each other.

The locations of the half wave plates 16R, 16B do not always have to be those shown in FIG. 9, but they may be placed between the path length adjusting member 15R, 15B and the PBS 11R, 11B.

[Third Embodiment]

Figure 10:
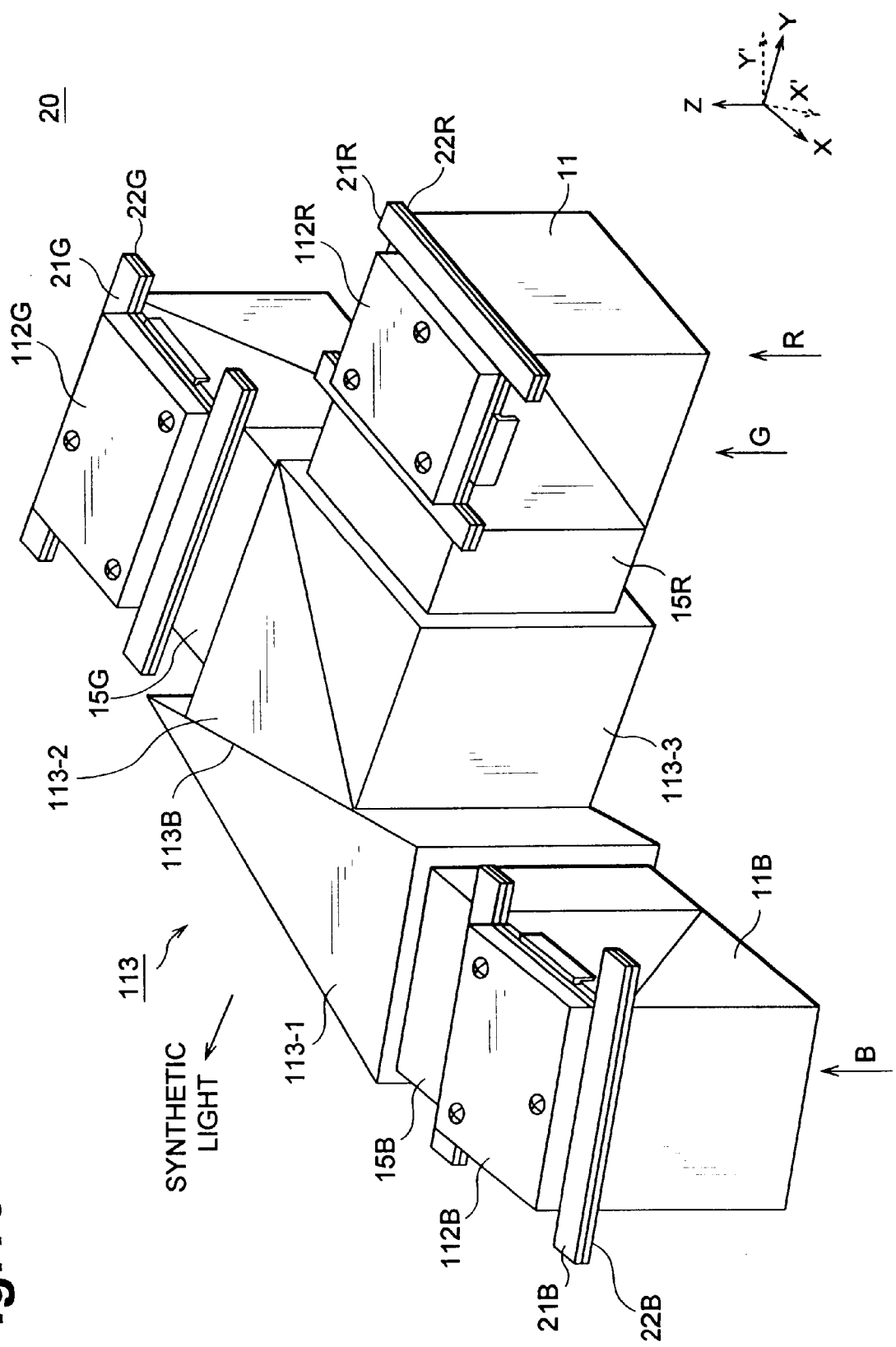
FIG. 10 is a perspective view to show the structure of the third embodiment of the present invention.

FIG. 10 shows the analyzing-synthesizing optical block 20 of the third embodiment according to the present invention. The third embodiment uses a dichroic prism composed of three triangular prisms with dichroic films on predetermined surfaces thereof, for example, without using the cross dichroic prism as the synthesizing optical system.

In the present embodiment, since the optic axis of the B light among the color beams is not parallel to the X-axis as detailed hereinafter, new X'-axis is defined as an axis parallel to the optic axis of the B light but not parallel to the X-axis on the X-Y plane in order to indicate the optic axis of the B light as illustrated, for easier understanding of description.

As illustrated, the dichroic prism 113 used in the present embodiment is a prism constructed by bonding three triangular prisms 113-1, 113-2, 113-3 with an adhesive and has B light reflecting dichroic film 113B and G light reflecting dichroic film 113G at the illustrated positions, thereby possessing the color synthesizing function.

The other fundamental structure is basically the same as that of the modifications of the second embodiment shown in FIG. 7 and FIG. 8. In the present embodiment each color beam of the R light, the G light, or the B light travels in the Z-direction to enter each color light PBS 11R, 11G, 11B, and each light valve 112R, 112G, 112B is placed on a surface in the Z-direction of each PBS 11R, 11B, 11G, i.e., on the top surface in the drawing. Because of this, the polarization separating film of each PBS 11R, 11B, 11G is oriented so as to emit the analytic light (modulated light) toward the dichroic prism 113. The trichromatic separation optical system is not illustrated herein, but those who skilled in the art can readily contemplate the structure necessary for making the three separate color beams incident in the Z-direction into each PBS 11R, 11B, 11G.

The light valves 112R, 112G, 112B are mounted on the PBSs 11R, 11G, 11B by use of the first mounting members 22R, 22G, 22B and the second mounting members 21R, 21G, 21B in the same manner as in the first embodiment. In the present embodiment the bent portions of the first mounting members 22R, 22G, 22B for mounting thereof onto the PBSs 11R, 11G, 11B are given between the legs for soldering of the members.

Each polarization separating portion of PBS 11R, 11G, 11B reflects only the modulated light of the output light modulated by the light valve body in each color light valve 112R, 112G, 112B, and the modulated light travels through the path adjusting member 15R, 15G, 15B and each color entrance surface of the dichroic prism 113 thereinto.

The detected light of the R light incident in the −Y-direction into the prism member 113-3 of the dichroic prism 113 travels straight to pass through the dichroic prisms 113-2, 113-1 and to be emitted in the −Y-direction from the exit surface. The analytic light of the G light is incident in the X-direction into the prism member 113-2 and is reflected by the dichroic film 113G to travel in the −Y-direction. Then the light travels through the dichroic prism 113-1 to be emitted in the −Y-direction from the exit surface. Finally, the B light incident in the −X'-direction into the prism 113-1 is totally reflected once by the exit surface of this prism 113-1 to travel in the Y'-direction. Then the light is reflected by the dichroic film 113B to travel in the −Y-direction and to be emitted in the same direction from the exit surface. As described above, the synthesis of three colors is achieved by the dichroic prism 113, and the projected image is emitted in the −Y-direction from the same exit surface to be projected onto the screen by the projection lens not illustrated.

It is needless to mention that only the dichroic prism 113 needs to be fixed to the floor member in the present embodiment as well.

[Fourth Embodiment]

The fourth embodiment of the present invention will be described below referring to FIG. 11.

Figure 11:
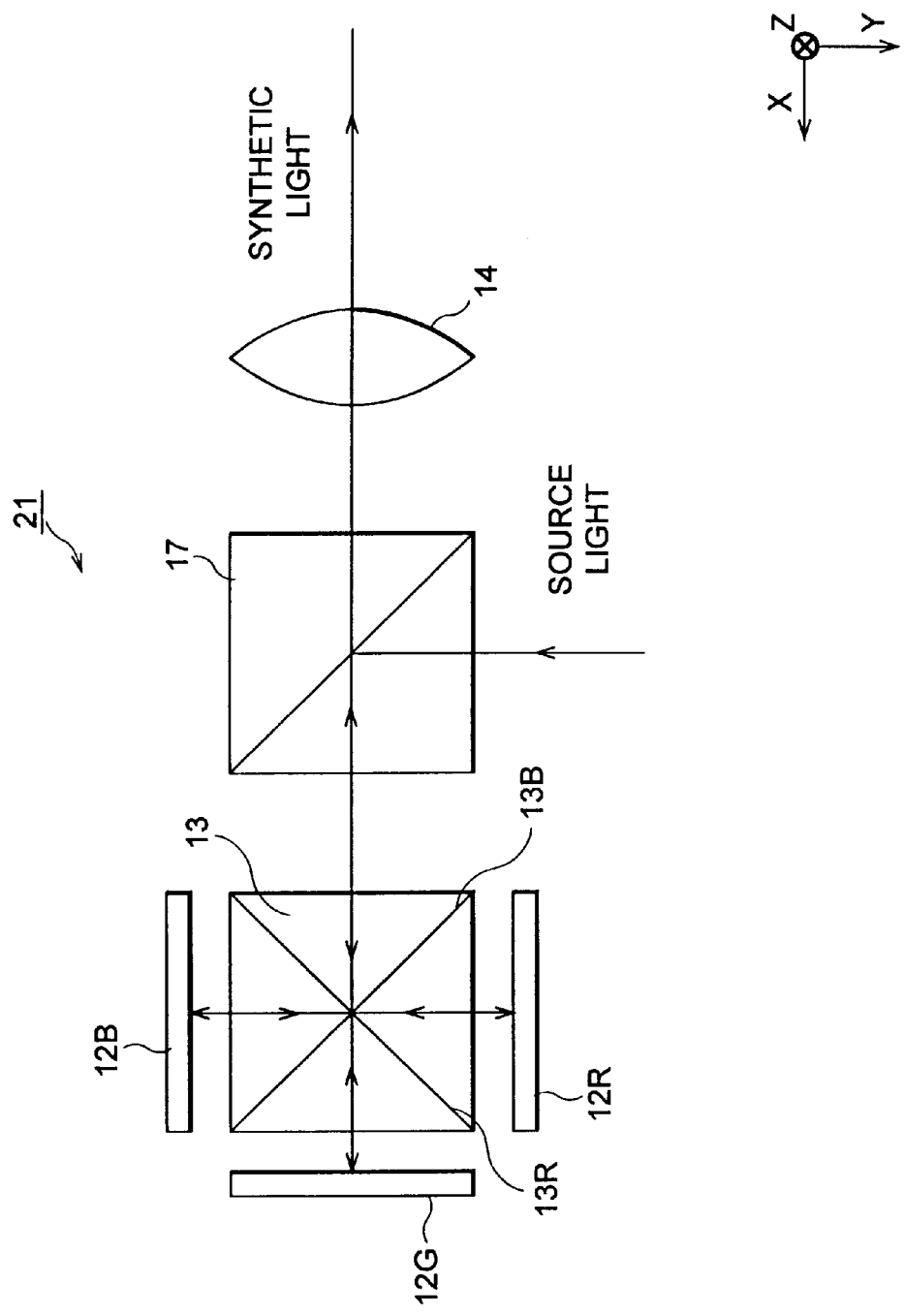
FIG. 11 is an overall schematic diagram to show an optical path configuration of the fourth embodiment of the present invention.

FIG. 11 is a schematic, structural drawing to show the projection type display apparatus of the present embodiment.

The optical block 20' of the present embodiment is characterized in that the cross dichroic prism 13 serves as a trichromatic separation optical system and as a synthesizing optical system, different from the first to the third embodiments described above. Another feature is that the analyzing optical system has only one PBS ready for the all colors, without providing the PBSs for the respective colors.

The source light emitted from the light source not illustrated is incident in the −Y-direction into the PBS 17 and a specific polarization component of the light is separated and travels in the X-direction to enter the cross dichroic prism 13. The structure of this dichroic prism 13 is the same as that in the first embodiment. The light is split by the R light reflecting dichroic film 13R and the B light reflecting dichroic film 13B arranged in the X-shape in this dichroic prism 13, so that the R light is reflected into the Y-direction, the B light into the −Y-direction, and the G light travels straight in the X-direction without being reflected. Then each beam is incident to the associated light valve 12R, 12B, 12G for each color. The light including the modulated light subject to modulation in these light valves is incident again into the dichroic prism 13 and then the R light reflecting dichroic film 13R and B light reflecting dichroic film 13B arranged in the X-shape in the dichroic prism 13 reflect the R light and the B light but transmit the G light. The beams of the three colors all are bent into the −X-direction to be synthesized and enter the PBS 17. The polarization separating film of the PBS 17 outputs only the modulated light in the −X-direction to project a full color image through the projection lens 14 onto the screen not illustrated.

Figure 12:
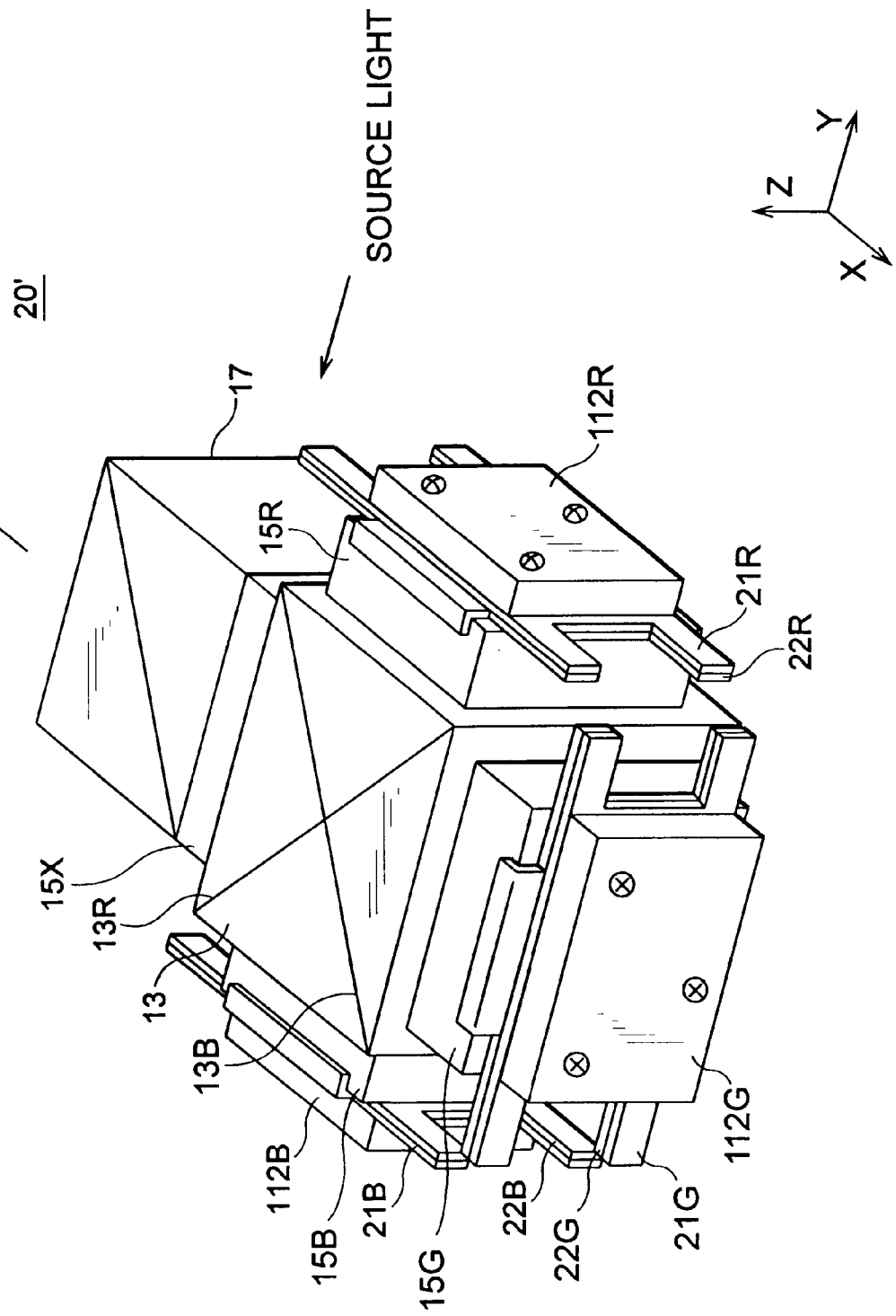
FIG. 12 is a perspective view of the configuration of the fourth embodiment.

FIG. 12 is a perspective view to show the detailed structure of this optical system. The light valves 112R, 112G, 112B each held in a package are mounted using the mounting members 21R, 21G, 21B, 22R, 22G, 22B in the same manner as in the first embodiment. Each light valve 112R, 112G, 112B may be mounted directly on the dichroic prism 13, but mounting through the path length adjusting member 15R, 15B, 15G is more preferable, because they make it easier to adjust the optical path lengths of the respective color beams nearly equal to each other and because they make adjustment of pixels easier without collision between the mounting members illustrated. It is preferable that the path length adjusting member 15X be also interposed between the PBS 17 and dichroic prism 13, for adjustment of the position of incidence of the source light.

The light valves may be attached directly to the respective path length adjusting members with an adhesive without using the mounting members, as in the second embodiment and the other embodiments.

In the present embodiment the trichromatic separation optical system and the analyzing-synthesizing optical system all are integrated. When this is held on the base at the portion of dichroic prism 13 or PBS 17, the effect of thermal expansion etc. due to the temperature change can be minimized accordingly. The optical path lengths of the respective colors after the separation in the present embodiment are shorter than those in the other embodiments, and the present embodiment thus has an advantage that the apparatus structure is compact.

As described above, the optical block 20' of the present embodiment may be held on the base at either portion of the dichroic prism 13 or the PBS 17. It is more preferably held on the PBS 17 side, because the positional relation with the projection lens will not vary. When the PBS 17 and path length adjusting member 15X can be made of a material having a small thermal expansion coefficient and in a small thickness because of easiness of fixing, the focus deviation can also be reduced similarly even if the optical block is fixed on the dichroic prism 13 side.

[Fifth Embodiment]

Figure 13:
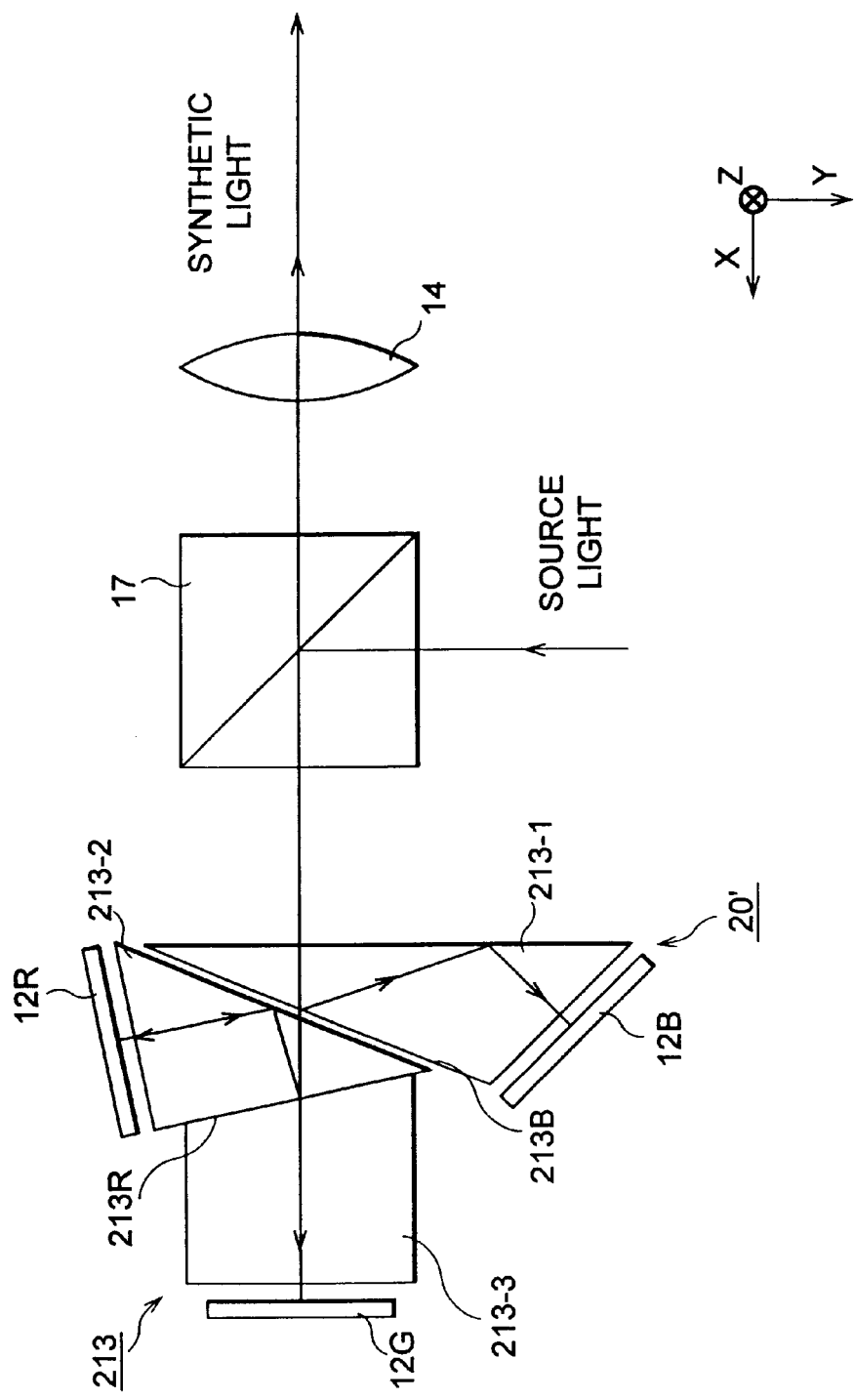
FIG. 13 is an overall schematic diagram to show an optical path configuration of the fifth embodiment of the present invention.
Figure 14:
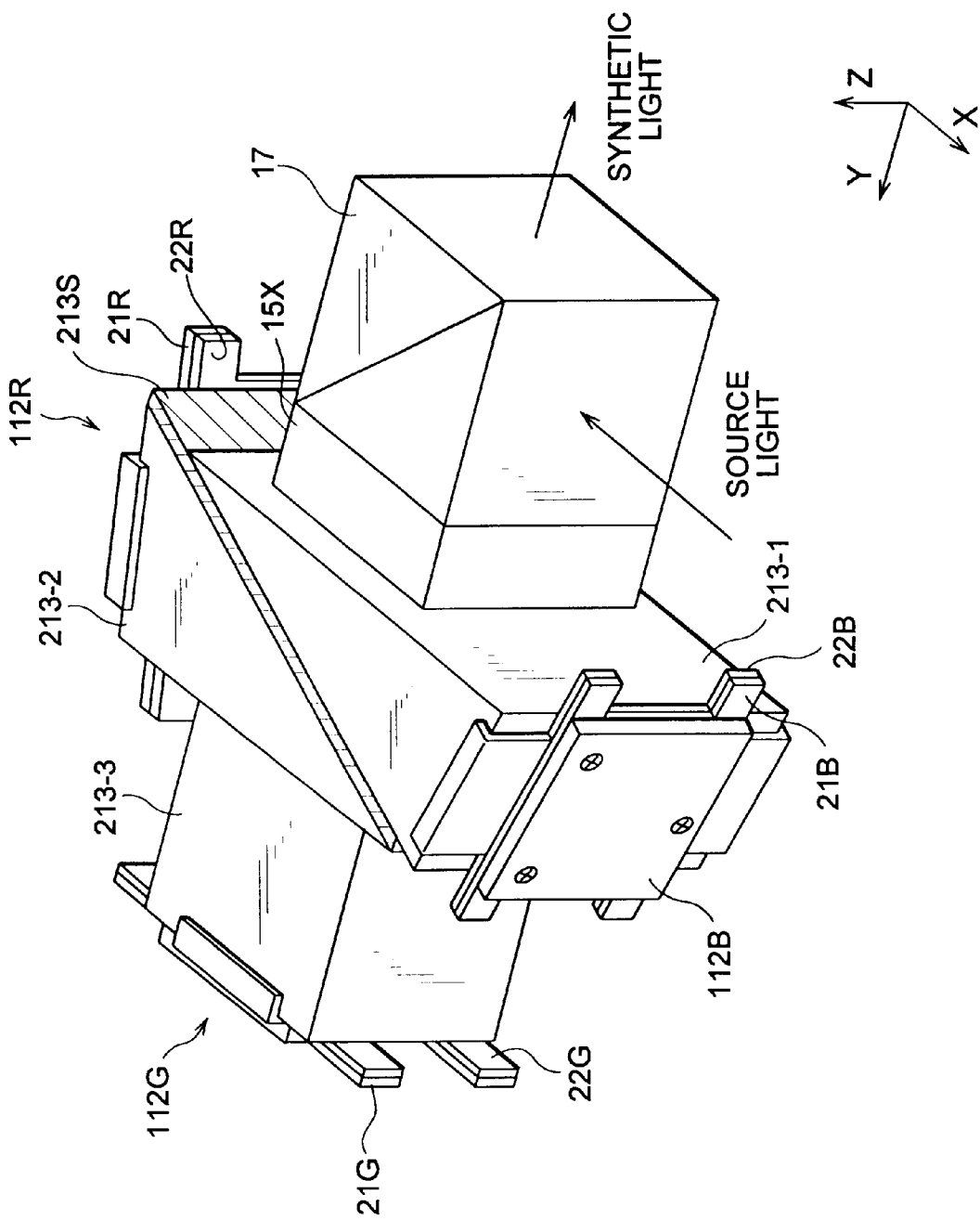
FIG. 14 is a perspective view of the configuration of the fifth embodiment.
Figure 15:
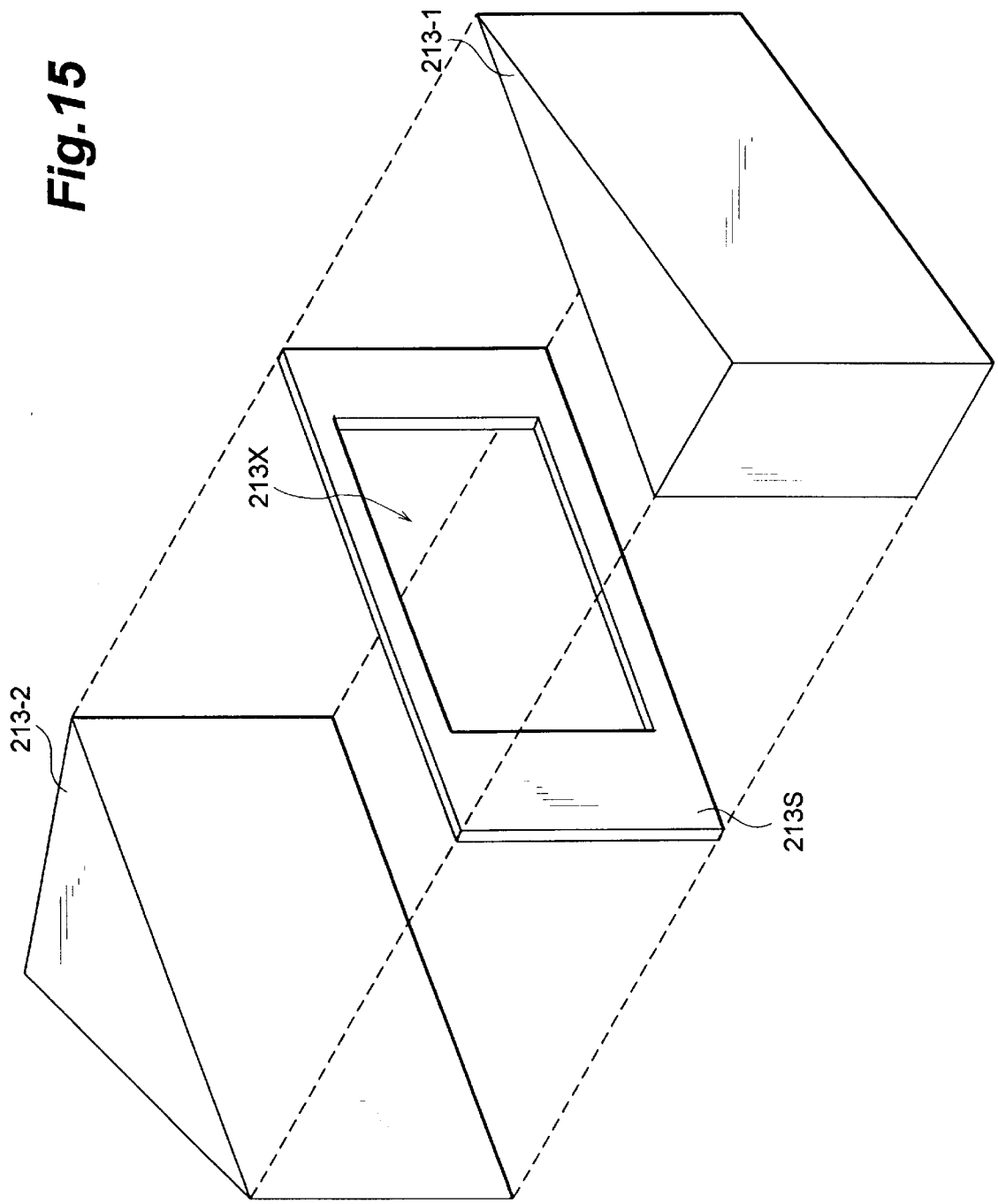
FIG. 15 is a detailed perspective view to show the structure of a prism portion in the fifth embodiment.

FIG. 13 is an overall schematic view of the fifth embodiment of the present invention. This embodiment is characterized in that so-called Philips prism 213 is used instead of the dichroic prism 13 of the fourth embodiment shown in FIG. 11. FIG. 14 is a perspective view to show the structure of the optical block 20' of this embodiment and FIG. 15 is an exploded perspective view to show the structure of part of the Philips prism 213.

The fundamental structure of the present embodiment is the same as that of the fourth embodiment. The Philips prism 213 herein has the structure in which two prisms of a triangular prism shape 213-1, 213-2 are bonded with a spacer 213S in between to make a space between them as shown in FIG. 15 and in which a quadrangular prism 213-3 having the cross section of a trapezoid is bonded to the surface opposed to the bond surface of the prism 213-2 as shown in FIG. 14.

The operation of this optical block 20'will be described referring to FIG. 13. The description will be omitted as to the common parts to the other embodiments. Polarized light traveling in the X-direction is incident into this Philips prism 213 and only the B light thereof is reflected by the B light reflecting dichroic film formed on the X-directional end face of the prism 213-1. The B light reflected in this way is again reflected in this prism 213-1 to enter the light valve 12B for B light. On the other hand, the R light and G light travels through the prism 213-2 and only the R light is reflected by the R light reflecting dichroic film 213R formed at the border between the prisms 213-2 and 213-3. The R light reflected is totally reflected at the interface to the space formed by the spacer 213S (not illustrated in FIG. 13) to enter the light valve 12R for R light. The remaining G light travels straight through the prism 213-3 to enter the light valve 12G for G light. Beams emitted from the respective light valves 12R, 12G, 12B travel in the reverse paths to be synthesized, and only modulated light is extracted by the PBS 17. The synthetic light is projected through the projection lens 14 onto the screen not illustrated to form a full color image thereon.

FIG. 14 shows the direct mounting form of the light valves on the Philips prism through the mounting members as in the first embodiment, but the light valve bodies may be attached to the Philips prism with an adhesive or the path length adjusting members may be interposed between them.

The present embodiment also achieves the same effects as the fourth embodiment.

[Sixth Embodiment]

Figure 16:
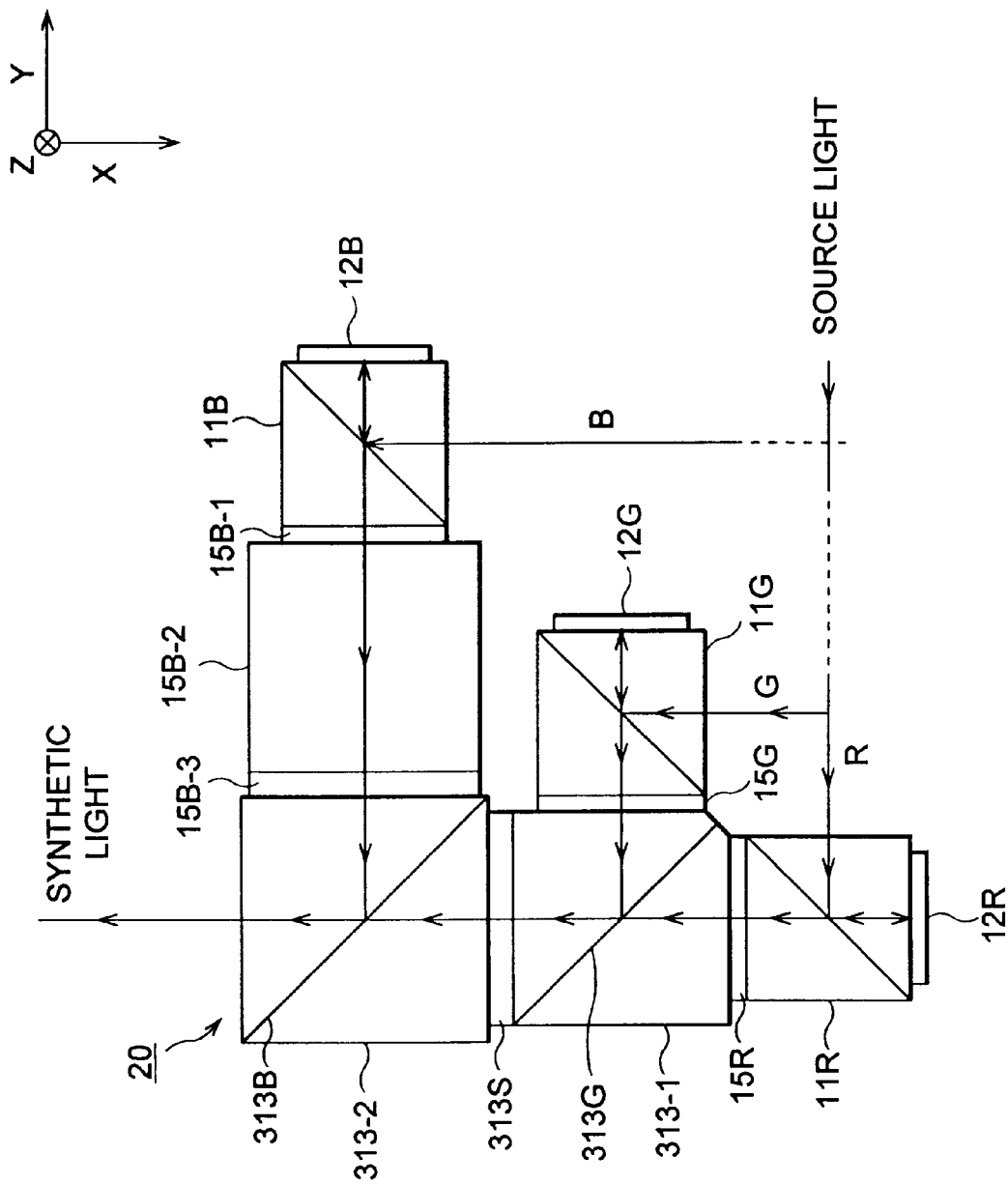
FIG. 16 is an overall schematic diagram to show an optical path configuration of the sixth embodiment of the present invention.
Figure 17:
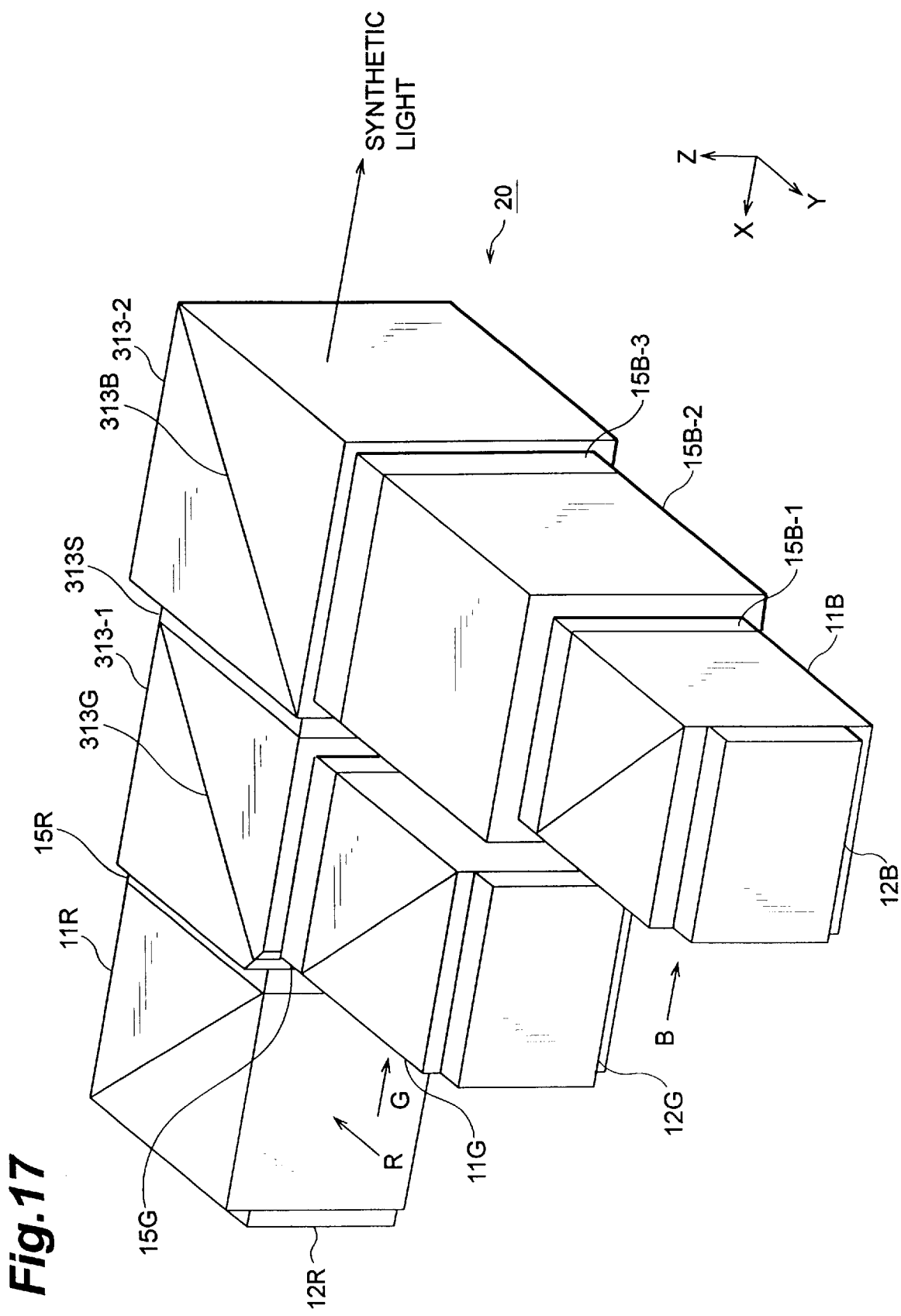
FIG. 17 is a perspective view of the configuration of the sixth embodiment.
Figure 18:
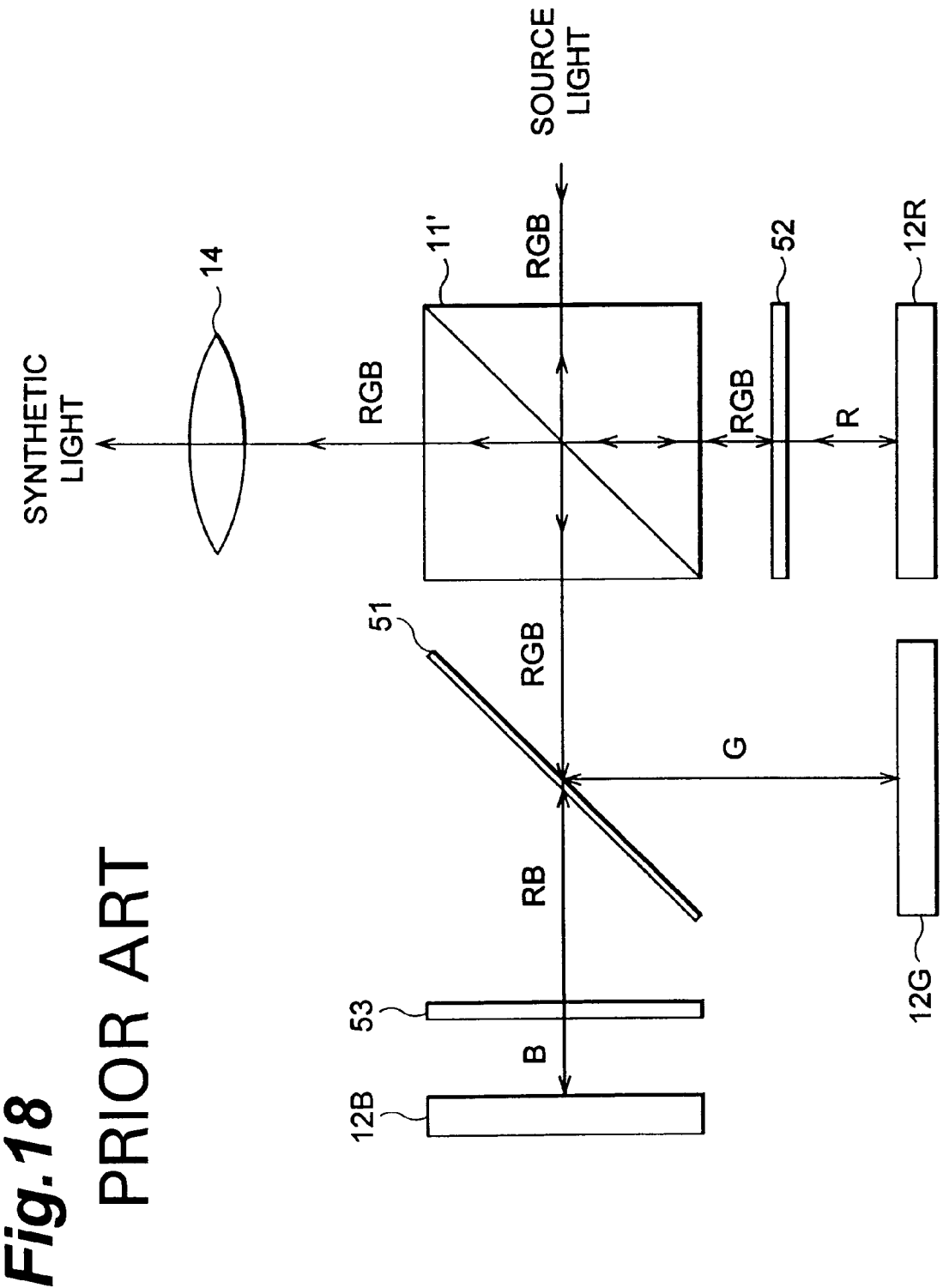
FIG. 18 is an overall schematic diagram of the conventional projection type display apparatus.

FIG. 16 is an overall schematic diagram of the sixth embodiment according to the present invention and FIG. 17 is a perspective view to show the structure of the analyzing-synthesizing optical block 20 thereof.

This embodiment is characterized in that the synthesizing optical system is composed of two dichroic prisms 313-1, 313-2. Specifically, the dichroic prism 313-1 for synthesis of the R light and G light is bonded through path adjusting member 313S to the dichroic prism 313-2 for further combining this synthetic light with the B light. The dichroic prism 313-1 or 313-2 has the G light reflecting dichroic film 313G or the B light reflecting dichroic film 313B, respectively, inside. The other structure is basically similar to that of the second embodiment shown in FIGS. 5 and 6.

As apparent from FIGS. 16 and 17, the optical path lengths of the respective color beams are adjusted so as to be nearly equal by use of the path length adjusting members 15B-1, 15B-2, 15B-3, 15G, 15R, and 313S. By securing the dichroic prism 313-2 to the base, the relative positional relation is assured between the other components and the dichroic prism 312-2 accordingly. Therefore, the effect of expansion or the like of the base can be suppressed with change in temperature and the registration deviation and focus deviation can be suppressed, as in the embodiments described above. Further, the present embodiment has an advantage that the adjustment of optical path of the analyzing optical system is easier, because the trichromatic separation optical system can be composed of only the B light reflecting dichroic mirror and G light reflecting dichroic mirror, though not illustrated.

As described above in each of the embodiments of the present invention, the invention can provide the projection type display apparatus that can minimize the deviation of corresponding pixels among the colors and also minimize the focus deviation with change in the ambient temperature, by employing the integral form of the light valves, PBSs, and the dichroic prism for synthesis of colors. Particularly, the base does not always have to be made of a material having a small thermal expansion coefficient, so that the housing can be a cheap member having a large thermal expansion coefficient but being lightweight and strong, such as the aluminum alloys or FRP, which is effective.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An analyzing-synthesizing optical system unit for projection image display apparatus in which beams of the three primary colors of R, G, and B are modulated by respective, dedicated polarization beam splitters and light valves, the modulated beams are extracted, and a synthesizing optical system synthesizes the modulated beams of the three colors to output synthetic light, wherein said light valves and said polarization beam splitters are fixed as integrated with said synthesizing optical system and wherein optical path lengths of optical paths of the respective color beams, each optical path being established by said light valve, said polarization beam splitter, and said synthesizing optical system, are approximately equal to each other; and wherein each of said polarization beam splitters is fixed in a constituent member to which said synthesizing optical system is also fixed.

2. The analyzing-synthesizing optical system unit according to claim 1, wherein each of said polarization beam splitters is fixed by being joined directly or indirectly through another optical member, to an entrance surface of said synthesizing optical system for each color beam.

3. The analyzing-synthesizing optical system unit according to claim 1, wherein a half wave plate is interposed between at least one of said polarization beam splitters and said synthesizing optical system.

4. The analyzing-synthesizing optical system unit according to claim 1, wherein each said light valve is fixed to said polarization beam splitter by use of a mounting member.

5. The analyzing-synthesizing optical system unit according to claim 1, wherein each said light valve is fixed by being bonded to said polarization beam splitter.

6. The analyzing-synthesizing optical system unit according to claim 1, wherein said synthesizing optical system is a cross dichroic prism.

7. The analyzing-synthesizing optical system unit according to claim 1, wherein said synthesizing optical system is a combination of three triangular prisms or a combination of two triangular prisms with one quadrangular prism with reflecting films for reflecting respective, predetermined color components being formed on predetermined surfaces.

8. An optical system unit for projection image display apparatus in which incident white light is polarized and separated by a polarization beam splitter, the polarized light is separated into beams of the three primary colors of R, G, and B by a separating-synthesizing optical system, the beams are modulated by respective, dedicated light valves, the modulated beams are synthesized again by said separating-synthesizing optical system, and said polarization beam splitter extracts only the modulated beams to output synthetic light, wherein said light valves and said polarization beam splitter are fixed as integrated with said synthesizing optical system and wherein optical path lengths of optical paths of the respective color beams, each optical path being established by said light valve and said separating-synthesizing optical system, are approximately equal to each other, and wherein said polarization beam splitter is fixed in a constituent member to which said separating-synthesizing optical system is also fixed.

9. The optical system unit according to claim 8, wherein said polarization beam splitter is fixed by being joined directly or indirectly through another optical member, to an entrance/exit surface of said separating-synthesizing optical system.

10. The optical system unit according to claim 8, wherein each said light valve is fixed to said separating-synthesizing optical system by use of a mounting member.

11. The optical system unit according to claim 8, wherein each said light valve is fixed by being bonded to said separating-synthesizing optical system.

12. The optical system unit according to claim 8, wherein said separating-synthesizing optical system is a cross dichroic prism.

* * * * *